(12) United States Patent
Kobayashi

(10) Patent No.: US 9,784,894 B2
(45) Date of Patent: Oct. 10, 2017

(54) OPTICALLY ANISOTROPIC SHEET

(71) Applicant: SUMITOMO CHEMICAL COMPANY, LIMITED, Tokyo (JP)

(72) Inventor: Tadahiro Kobayashi, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 142 days.

(21) Appl. No.: 14/610,923

(22) Filed: Jan. 30, 2015

(65) Prior Publication Data

US 2015/0219812 A1   Aug. 6, 2015

(30) Foreign Application Priority Data

Jan. 31, 2014   (JP) ................. 2014-017307

(51) Int. Cl.
| | | |
|---|---|---|
| C09K 19/00 | (2006.01) | |
| G02B 5/30 | (2006.01) | |
| B32B 37/12 | (2006.01) | |
| B32B 37/24 | (2006.01) | |
| B32B 38/10 | (2006.01) | |
| B32B 37/26 | (2006.01) | |

(52) U.S. Cl.
CPC ............ *G02B 5/3016* (2013.01); *B32B 37/12* (2013.01); *B32B 37/1284* (2013.01); *B32B 37/24* (2013.01); *B32B 38/10* (2013.01); *G02B 5/3083* (2013.01); *B32B 2037/1253* (2013.01); *B32B 2037/268* (2013.01); *B32B 2457/20* (2013.01); *B32B 2551/00* (2013.01); *Y10T 428/10* (2015.01); *Y10T 428/1036* (2015.01)

(58) Field of Classification Search
CPC ...... G02B 5/3016; G02B 5/32; G02B 5/3083; C09K 19/3809; C09K 19/3833; C09K 19/3838; C09K 19/542; C09K 2019/2078; C09K 2019/0448; G02F 1/13363; G02F 1/133632; G02F 1/133634; Y10T 428/10; Y10T 428/1036; Y10T 428/1045; Y10T 428/105
USPC ........ 428/1.1, 1.3, 1.33, 1.32; 349/117, 194, 349/121, 118; 252/299.64–299.68
See application file for complete search history.

(56) References Cited

U.S. PATENT DOCUMENTS

| | | |
|---|---|---|
| 4,977,013 A | 12/1990 | Ritchie et al. |
| 5,061,042 A | 10/1991 | Nakamura et al. |
| (Continued) | | |

FOREIGN PATENT DOCUMENTS

| | | |
|---|---|---|
| EP | 1669431 A1 | 6/2006 |
| JP | 6-34976 A | 2/1994 |
| (Continued) | | |

OTHER PUBLICATIONS

Ekisho Binran Henshuuiinkai, "Handbook of Liquid Crystals," Maruzen Company, Limited, Oct. 30, 2000, pp. 408-411, 562-563, with an English translation (16 pages total).

(Continued)

*Primary Examiner* — Ruiyun Zhang
(74) *Attorney, Agent, or Firm* — Birch, Stewart, Kolasch & Birch, LLP

(57) ABSTRACT

The present invention relates to an optically anisotropic sheet comprising a substrate and a liquid crystal cured layer laminated together, wherein the substrate has a surface roughness of 1.0 nm or less in a field of view of 1 $\mu m^2$ and a water contact angle of 70° or more.

9 Claims, 2 Drawing Sheets

(56) References Cited

U.S. PATENT DOCUMENTS

| | | | |
|---|---|---|---|
| 5,688,436 A * | 11/1997 | Ohnishi | C09K 19/3852 252/299.01 |
| 6,576,344 B1 | 6/2003 | Doushita et al. | |
| 6,762,504 B1 * | 7/2004 | Yamada | H01L 21/563 257/782 |
| 7,976,669 B2 | 7/2011 | Miyatake et al. | |
| 8,323,527 B2 | 12/2012 | Adlem et al. | |
| 8,383,212 B2 | 2/2013 | Obata et al. | |
| 8,748,068 B2 | 6/2014 | Kaneiwa et al. | |
| 8,861,083 B2 | 10/2014 | Sawanobori et al. | |
| 2001/0010857 A1 * | 8/2001 | Yagi | B32B 27/00 428/142 |
| 2007/0126966 A1 | 6/2007 | Takahashi | |
| 2008/0094704 A1 | 4/2008 | Kimura et al. | |
| 2008/0099134 A1 * | 5/2008 | Tadakuma | B32B 37/0076 156/250 |
| 2008/0266493 A1 | 10/2008 | Yonezawa et al. | |
| 2009/0207491 A1 | 8/2009 | Takebe et al. | |
| 2009/0273837 A1 * | 11/2009 | Kawai | B29C 41/24 359/489.2 |
| 2009/0290100 A1 | 11/2009 | Haruta et al. | |
| 2010/0151252 A1 * | 6/2010 | Yamamoto | B32B 37/24 428/411.1 |
| 2010/0272973 A1 * | 10/2010 | Lee | B32B 7/12 428/213 |
| 2012/0008224 A1 | 1/2012 | Uchida | |
| 2013/0107173 A1 | 5/2013 | Takeda et al. | |
| 2013/0250229 A1 | 9/2013 | Kaneiwa et al. | |
| 2014/0020939 A1 * | 1/2014 | Nishio | C08J 5/18 174/257 |
| 2015/0010749 A1 * | 1/2015 | Oi | G06F 3/041 428/329 |
| 2015/0042943 A1 | 2/2015 | Hatanaka et al. | |
| 2015/0062505 A1 | 3/2015 | Hatanaka et al. | |
| 2015/0160389 A1 | 6/2015 | Kobayashi | |
| 2015/0183945 A1 | 7/2015 | Shiraishi et al. | |
| 2015/0218453 A1 | 8/2015 | Kobayashi et al. | |
| 2016/0137789 A1 | 5/2016 | Suenaga et al. | |

FOREIGN PATENT DOCUMENTS

| | | | |
|---|---|---|---|
| JP | 2006-161051 A | | 6/2006 |
| JP | 2007-271942 A | | 10/2007 |
| JP | 2007-304620 A1 | | 11/2007 |
| JP | 2010-24438 A | | 2/2010 |
| JP | 2010-31223 A | | 2/2010 |
| JP | 2010-270108 A | | 12/2010 |
| JP | 2010-537955 A | | 12/2010 |
| JP | 2011-6360 A | | 1/2011 |
| JP | 2011-33791 A | | 2/2011 |
| JP | 2011-207765 A | | 10/2011 |
| JP | 2011207765 A | * | 10/2011 |
| JP | 2011-242743 A | | 12/2011 |
| JP | 2012-32424 A | | 2/2012 |
| JP | 2012-33249 A | | 2/2012 |
| JP | 2013-33248 A | | 2/2013 |
| JP | 2013033248 A | * | 2/2013 |
| WO | WO 2007/046223 A1 | | 4/2007 |
| WO | WO 2011/024683 A1 | | 3/2011 |
| WO | WO 2012/067128 A1 | | 5/2012 |

OTHER PUBLICATIONS

Japan Society for The Promotion of Science, 142nd Committee, "Liquid Crystal Device Handbook," Nikkan Kogyo Shimbun, Ltd., Sep. 29, 1989, pp. 199-202 with an English translation (12 pages total).

U.S. Office Action dated Jan. 5, 2017, for U.S. Appl. No. 14/611,076.

U.S. Office Action dated Aug. 30, 2016, for U.S. Appl. No. 14/611,076.

U.S. Office Action dated Sep. 23, 2016, for U.S. Appl. No. 14/610,857.

* cited by examiner

Fig.2
(a)
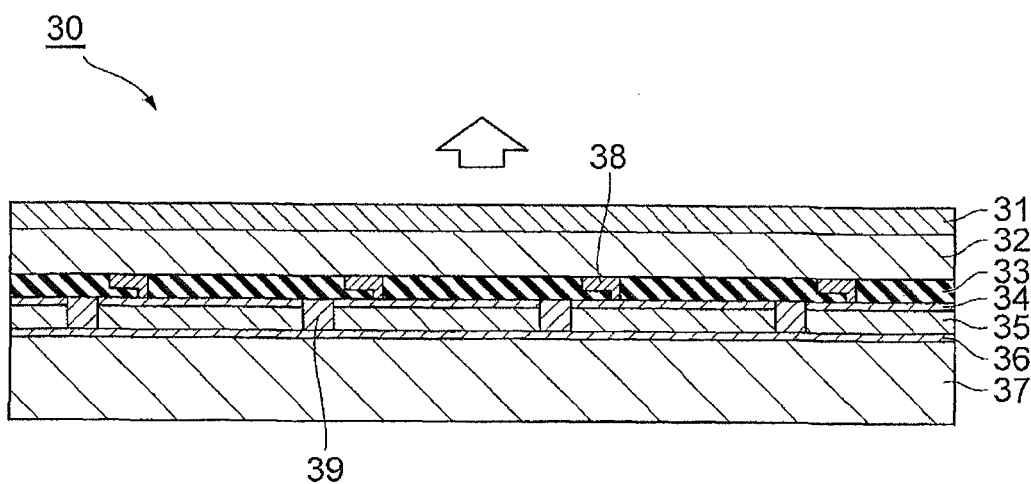
(b)
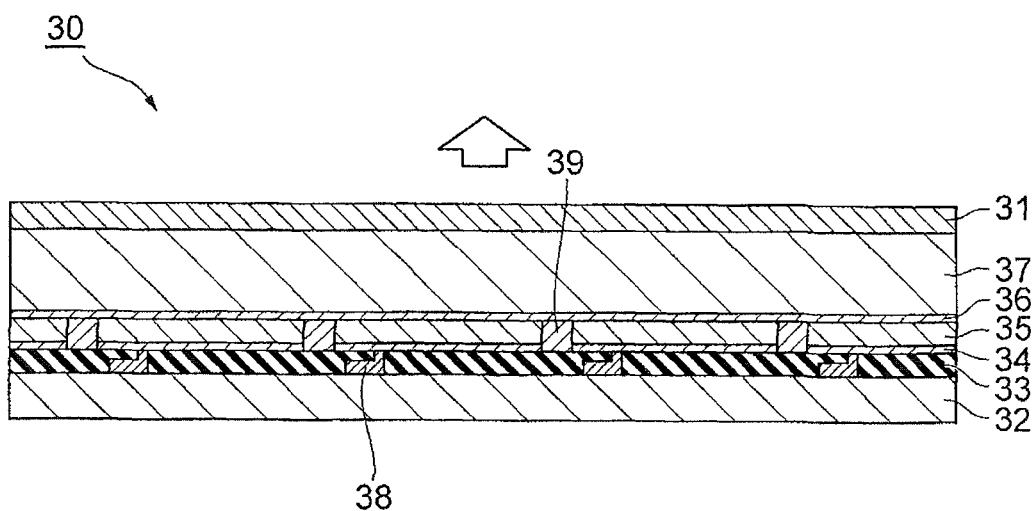

OPTICALLY ANISOTROPIC SHEET

TECHNICAL FIELD

The present invention relates to optically anisotropic sheets.

BACKGROUND

Flat panel display devices (FPD) are provided with a member including an optical film such as a polarizing plate and a retardation plate. Optical films that include liquid crystal cured layers formed from polymerizable liquid crystals are known as such up optical films. JP 2010-537955 T discloses an optical film including a liquid crystal cured layer having reverse wavelength dispersibility.

SUMMARY

Conventional optical films entail the problem of defects such as traces of peeling in the liquid crystal cured layer being generated, when the liquid crystal cured layer is transferred.

The present invention includes the following aspects:

[1] An optically anisotropic sheet comprising a substrate and a liquid crystal cured layer laminated together, wherein the substrate has a surface roughness of 1.0 nm or less in a field of view of 1 µm$^2$ and a water contact angle of 70° or more.
[2] The optically anisotropic sheet according to [1], wherein the substrate comprises polyethylene terephthalate.
[3] The optically anisotropic sheet according to [1] or [2], further having an orientation layer between the substrate and the liquid crystal cured layer.
[4] The optically anisotropic sheet according to any one of [1] to [3], wherein the liquid crystal cured layer satisfies formulas (1) and (2):

$$Re(450)/Re(550) \leq 1.00 \quad (1)$$

$$1.00 \leq Re(650)/Re(550) \quad (2)$$

where Re(450), Re(550), and Re(650) represent front retardation values at wavelengths of 450 nm, 550 nm and 650 nm, respectively.
[5] The optically anisotropic sheet according to any one of [1] to [4], wherein the liquid crystal cured layer has the thickness of 0.5 to 5 µm.
[6] A laminate that is obtained by forming an adhesive layer on the surface of the liquid crystal cured layer of the optically anisotropic sheet according to any one of [1] to [5], and then laminating a receiver on the adhesive layer, and then removing the substrate of the optically anisotropic sheet.
[7] A display device comprising the laminate according to [6].

The optically anisotropic sheet according to the present invention facilitates transfer of the optically anisotropic film including a liquid crystal cured layer to attain an optically anisotropic film that barely has defects.

BRIEF DESCRIPTION OF THE DRAWINGS

FIG. 2 is a schematic view showing an organic EL display device including a circularly polarizing plate including a liquid crystal cured layer.

DETAILED DESCRIPTION

[Optically Anisotropic Sheet]

Figure 1:
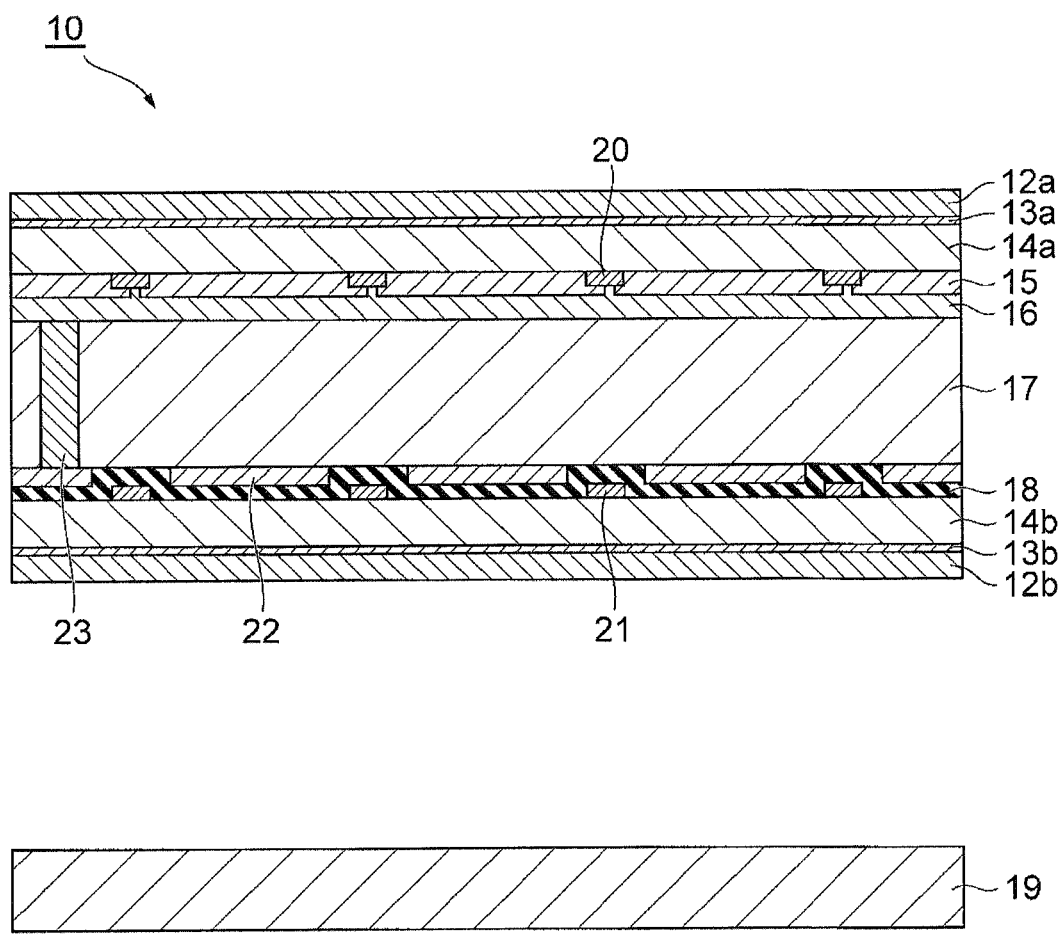
FIG. 1 is a schematic view showing a liquid crystal display device including a liquid crystal cured layer.

An optically anisotropic sheet according to the present embodiment comprises a substrate and a liquid crystal cured layer laminated together, and the substrate has a surface roughness of 1.0 nm or less in a field of view of 1 µm$^2$ and a water contact angle of 70° or more.

<Liquid Crystal Cured Layer>

The liquid crystal cured layer is usually obtained by applying a composition comprising a polymerizable liquid crystal compound (hereinafter sometimes referred to as a composition for forming a liquid crystal cured layer) onto a substrate or an orientation layer formed on the substrate, and polymerizing the polymerizable liquid crystal compound.

The liquid crystal cured layer is cured in the state where the polymerizable liquid crystal compound is oriented, and has a thickness of 5 µm or less; preferably, the liquid crystal cured layer is cured in the state where the polymerizable liquid crystal compound is oriented horizontally to the in-plane of the substrate.

The thickness of the liquid crystal cured layer is in the range of preferably 0.5 to 5 µm, more preferably 1 to 3 µm. The thickness of the liquid crystal cured layer can be measured with an interference film thickness meter, a laser microscope, or a contact type film thickness meter with a stylus.

In the liquid crystal cured layer, a front retardation value Re(λ) to the light at a wavelength of λ nm preferably satisfies formulas (1) and (2), more preferably formulas (1), (2) and (3):

$$Re(450)/Re(550) \leq 1.00 \quad (1)$$

$$1.00 \leq Re(650)/Re(550) \quad (2)$$

$$100 < Re(550) < 150 \quad (3)$$

where Re(450) represents a front retardation value at a wavelength of 450 nm, Re(550) represents a front retardation value at a wavelength of 550 nm, and Re(650) represents a front retardation value at a wavelength of 650 nm.

The front retardation value of the liquid crystal cured layer can be adjusted by the thickness of the liquid crystal cured layer. The front retardation value is determined by a formula (50); to attain a desired front retardation value (Re(λ)), Δn(λ) and a film thickness d may be adjusted.

$$Re(\lambda) = d \times \Delta n(\lambda) \quad (50)$$

where Re(λ) represents a front retardation value at a wavelength of λ nm, d represents a film thickness, and Δn(λ) represents a birefringence at a wavelength of λ nm.

The birefringence Δn(λ) can be determined by measuring the front retardation value, and dividing the measured front retardation value by the thickness of the liquid crystal cured layer. The specific measuring method will be described in Examples; in the measurement, substantial properties of the liquid crystal cured layer can be measured by measuring a liquid crystal cured layer formed on a substrate itself having no in-plane retardation, such as a glass substrate.

The polymerizable liquid crystal compound indicates a liquid crystalline compound having a polymerizable group. The polymerizable group indicates a group involving a polymerization reaction, and is preferably a photopolymerizable group. Through the specification, the photopolymerizable group indicates a group that can be involved in a polymerization reaction due to an active radical or an acid generated from a photopolymerization initiator.

Examples of the polymerizable group include a vinyl group, a vinyloxy group, a 1-chlorovinyl group, an isopropenyl group, a 4-vinylphenyl group, an acryloyloxy group, and a methacryloyloxy group. Among these, an acryloyloxy group, a methacryloyloxy group, and a vinyloxy group are preferable, and an acryloyloxy group is more preferable. The type of liquid crystals may be thermotropic or lyotropic, and if thermotropic, may be nematic or smectic. The type of liquid crystals is preferably thermotropic nematic from the viewpoint of ease of production.

<Polymerizable Liquid Crystal Compound>

Examples of the polymerizable liquid crystal compound include compounds represented by formula (A) (hereinafter sometimes referred to as Compound (A)). These polymerizable liquid crystal compound may be used singly or in combination.

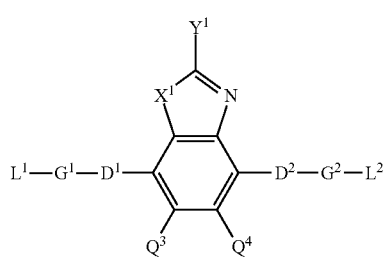 (A)

where $X^1$ represents an oxygen atom, a sulfur atom, or $-NR^1-$; $R^1$ represents a hydrogen atom or an alkyl group having 1 to 4 carbon atoms;

$Y^1$ represents an optionally substituted monovalent aromatic hydrocarbon group having 6 to 12 carbon atoms or an optionally substituted monovalent aromatic heterocyclic group having 3 to 12 carbon atoms;

$Q^3$ and $Q^4$ each independently represent a hydrogen atom, an optionally substituted monovalent aliphatic hydrocarbon group having 1 to 20 carbon atoms, a monovalent alicyclic hydrocarbon group having 3 to 20 carbon atoms, an optionally substituted monovalent aromatic hydrocarbon group having 6 to 20 carbon atoms, a halogen atom, a cyano group, a nitro group, $-NR^2R^3$ or $-SR^2$, or $Q^3$ bonds to $Q^4$ to form an aromatic ring or an aromatic heterocycle through carbon atoms bonded to $Q^3$ and $Q^4$; $R^2$ and $R^3$ each independently represent a hydrogen atom or an alkyl group having 1 to 6 carbon atoms;

$D^1$ and $D^2$ each independently represent a single bond, $-C(=O)-O-$, $-C(=S)-O-$, $-CR^4R^5-$, $-CR^4R^5-CR^6R^7-$, $-O-CR^4R^5-$, $-CR^4R^5-O-CR^6R^7-$, $-CO-O-CR^4R^5-$, $-O-CO-CR^4R^5-$, $-CR^4R^5-O-CO-CR^6R^7-$, $-CR^4R^5-CO-O-CR^6R^7-$, $-NR^4-CR^5R^6-$ or $-CO-NR^4-$;

$R^4$, $R^5$, $R^6$ and $R^7$ each independently represent a hydrogen atom, fluorine atom, or an alkyl group having 1 to 4 carbon atoms;

$G^1$ and $G^2$ each independently represent a divalent alicyclic hydrocarbon group having 5 to 8 carbon atoms, where the methylene group forming the alicyclic hydrocarbon group may be substituted by an oxygen atom, a sulfur atom or $-NH-$, and the methine group forming the alicyclic hydrocarbon group may be substituted by a tertiary nitrogen atom; and $L^1$ and $L^2$ each independently represent a monovalent organic group, and at least one of $L^1$ and $L^2$ has a polymerizable group.

In Compound (A), $L^1$ is preferably a group represented by formula (A1), and $L^2$ is preferably a group represented by formula (A2):

$$P^1-F^1-(B^1-A^1)_k-E^1- \tag{A1}$$

$$P^2-F^2(B^2-A^2)_l-E^2- \tag{A2}$$

where $B^1$, $B^2$, $E^1$ and $E^2$ each independently represent $-CR^4R^5-$, $-CH_2-CH_2-$, $-O-$, $-S-$, $-CO-O-$, $-O-CO-O-$, $-CS-O-$, $-O-CS-O-$, $-CO-NR^1-$, $-O-CH_2-$, $-S-CH_2-$, or a single bond;

$A^1$ and $A^2$ each independently represent a divalent alicyclic hydrocarbon group having 5 to 8 carbon atoms or a divalent aromatic hydrocarbon group having 6 to 18 carbon atoms, where the methylene group forming the alicyclic hydrocarbon group may be substituted by an oxygen atom, a sulfur atom or $-NH-$, and the methine group forming the alicyclic hydrocarbon group may be substituted by a tertiary nitrogen atom;

k and l each independently represent an integer of 0 to 3;

$F^1$ and $F^2$ each independently represent a divalent aliphatic hydrocarbon group having 1 to 12 carbon atoms;

$P^1$ represents a polymerizable group;

$P^2$ represents a hydrogen atom or a polymerizable group; and $R^4$ and $R^5$ each independently represent a hydrogen atom, a fluorine atom, or an alkyl group having 1 to 4 carbon atoms.

Preferable examples of Compound (A) include a polymerizable liquid crystal compound described in JP 2011-207765 A.

Examples of the polymerizable liquid crystal compound include compounds having a group represented by formula (X) (hereinafter sometimes referred to as "Compound (X)").

$$P^{11}-B^{11}-E^{11}-B^{12}-A^{11}-B^{13}- \tag{X}$$

where $P^{11}$ represents a polymerizable group;

$A^{11}$ represents a divalent alicyclic hydrocarbon group or a divalent aromatic hydrocarbon group; in the divalent alicyclic hydrocarbon group and the divalent aromatic hydrocarbon group, the hydrogen atom may be substituted by a halogen atom, an alkyl group having 1 to 6 carbon atoms, an alkoxy group having 1 to 6 carbon atoms, a cyano group or a nitro group, and in the alkyl group having 1 to 6 carbon atoms and the alkoxy group having 1 to 6 carbon atoms, the hydrogen atom may be substituted by a fluorine atom;

$B^{11}$ represents $-O-$, $-S-$, $-CO-O-$, $-O-CO-$, $-O-CO-O-$, $-CO-NR^{16}-$, $-NR^{16}-CO-$, $-CO-$, $-CS-$, or a single bond; $R^{16}$s each represent a hydrogen atom or an alkyl group having 1 to 6 carbon atoms;

$B^{12}$ and $B^{13}$ each independently represent $-C\equiv C-$, $-CH=CH-$, $-CH_2-CH_2-$, $-O-$, $-S-$, $-C(=O)-$, $-C(=O)-O-$, $-O-C(=O)-$, $-O-C(=O)-O-$, $-CH=N-$, $-N=CH-$, $-N=N-$, $-C(=O)NR^{16}-$, $-NR^{16}-C(=O)-$, $-OCH_2-$, $-OCF_2-$, $-CH_2O-$, $-CF_2O-$, $-CH=CH-C(=O)-O-$, $-O-C(=O)-CH=CH-$, or a single bond; and $E^{11}$ represents an alkanediyl group having 1 to 12 carbon atoms, where the hydrogen atom in the alkanediyl group may be substituted by an alkoxy group having 1 to 5 carbon atoms, and the hydrogen atom in the alkoxy group may be substituted by a halogen atom; and $-CH_2-$ forming the alkanediyl group may be substituted by $-O-$ or $-CO-$.

Specific examples of such polymerizable liquid crystal compounds include compounds having a polymerizable group among the compounds described in "3.8.6 Network (Complete crosslinking type)" and "6.5.1 Liquid crystal materials, b. Polymerizable nematic liquid crystal materials" in Ekisho Binran (Handbook of liquid crystals) (edited by Ekisho Binran Henshuuiinkai (Editorial committee for handbook of crystals), published by Maruzen Company, Limited, Oct. 30, 2000) and polymerizable liquid crystal compounds described in JP 2010-31223 A, JP 2010-270108 A, JP 2011-6360 A and JP 2011-207765 A.

The content of the polymerizable liquid crystal compound is usually 70 to 99.5 parts by mass, preferably 80 to 99 parts by mass, more preferably 80 to 94 parts by mass, still more preferably 80 to 90 parts by mass relative to 100 parts by mass of the solid content in the composition for forming a liquid crystal cured layer. At a content within this range, higher orientation is attained. Through the specification, the solid content indicates the total amount of the components in the composition for forming a liquid crystal cured layer excluding the solvent.

The composition for forming a liquid crystal cured layer may contain a solvent, a polymerization initiator, a sensitizer, a polymerization inhibitor and a leveling agent.

<Solvent>

Solvents that can completely dissolve the polymerizable liquid crystal compound are preferable; these solvents are preferably inactive in the polymerization reaction of the polymerizable liquid crystal compound.

Examples of the solvent include alcohol solvents such as methanol, ethanol, ethylene glycol, isopropyl alcohol, propylene glycol, ethylene glycol methyl ether, ethylene glycol butyl ether and propylene glycol monomethyl ether; ester solvents such as ethyl acetate, butyl acetate, ethylene glycol methyl ether acetate, γ-butyrolactone or propylene glycol methyl ether acetate, and ethyl lactate; ketone solvents such as acetone, methyl ethyl ketone, cyclopentanone, cyclohexanone, 2-heptanone and methyl isobutyl ketone; aliphatic hydrocarbon solvents such as pentane, hexane and heptane; aromatic hydrocarbon solvents such as toluene and xylene; nitrile solvents such as acetonitrile; ether solvents such as tetrahydrofuran and dimethoxyethane; and chlorine-containing solvents such as chloroform and chlorobenzene. These solvents may be used singly or in combination.

The content of the solvent is preferably 50 to 98 parts by mass relative to 100 parts by mass of the composition for forming a liquid crystal cured layer. The solid content in the composition for forming a liquid crystal cured layer is preferably 2 to 50 parts by mass relative to 100 parts by mass of the composition for forming a liquid crystal cured layer. At a solid content of 50 parts by mass or less, the composition for forming a liquid crystal cured layer has low viscosity, which attains a substantially uniform thickness of the liquid crystal cured layer; namely, unevenness barely occurs in the liquid crystal cured layer. The solid content can be determined in consideration of the thickness of the liquid crystal cured layer to be prepared.

<Polymerization Initiator>

The polymerization initiator can initiate polymerization reactions of polymerizable liquid crystal compounds and the like. A preferable polymerization initiator is a photopolymerization initiator that generates active radicals by action of light.

Examples of the polymerization initiator include benzoin compounds, benzophenone compounds, alkylphenone compounds, acylphosphine oxide compounds, triazine compounds, iodonium salts and sulfonium salts.

Examples of benzoin compounds include benzoin, benzoin methyl ether, benzoin ethyl ether, benzoin isopropyl ether and benzoin isobutyl ether.

Examples of benzophenone compounds include benzophenone, methyl o-benzoylbenzoate, 4-phenyl benzophenone, 4-benzoyl-4'-methyldiphenyl sulfide, 3,3',4,4'-tetra(tert-butylperoxy carbonyl)benzophenone and 2,4,6-trimethylbenzophenone.

Examples of alkylphenone compounds include oligomers of diethoxyacetophenone, 2-methyl-2-morpholino-1-(4-methylthiophenyl)propan-1-one, 2-benzyl-2-dimethylamino-1-(4-morpholinophenyl)butan-1-one, 2-hydroxy-2-methyl-1-phenylpropan-1-one, 1,2-diphenyl-2,2-dimethoxyethan-1-one, 2-hydroxy-2-methyl-1-[4-(2-hydroxyethoxyl)phenyl]propan-1-one, 1-hydroxycyclohexylphenyl ketone, and 2-hydroxy-2-methyl-1-[4-(1-methylvinyl)phenyl]propan-1-one.

Examples of acylphosphine oxide compounds include 2,4,6-trimethylbenzoyldiphenylphosphine oxide and bis(2,4,6-trimethylbenzoyl)phenylphosphine oxide.

Examples of triazine compounds include 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methylphenyl)ethenyl]-1,3,5-triazine, and 2,4-bis(trichloromethyl)-6-[2-(3,4-dimethoxyphenyl)ethenyl]-1,3,5-triazine.

Examples of commercially available polymerization initiators include "Irgacure (registered trademark) 907," "Irgacure 184," "Irgacure 651," "Irgacure 819," "Irgacure 250," and "Irgacure 369" (BASF Japan Ltd.); "SEIKUOL (registered trademark) BZ," "SEIKUOL Z," and "SEIKUOL BEE" (Seiko Chemical Co., Ltd.); "Kayacure (registered trademark) BP 100" (NIPPON KAYAKU Co., Ltd.); "UVI-6992" (manufactured by The Dow Chemical Company); "Adeka OPTOMER (registered trademark) SP-152" and "Adeka OPTOMER SP-170" (Adeka Corporation); "TAZ-A" and "TAZ-PP" (DKSH Japan K.K.); and "TAZ-104" (SANWA Chemical Co., Ltd.).

The content of the polymerization initiator is usually is 0.1 to 30 parts by mass, preferably 0.5 to 10 parts by mass, more preferably 0.5 to 8 parts by mass relative to 100 parts by mass of the polymerizable liquid crystal compound. A content of the polymerization initiator within this range is preferable because the orientation of the polymerizable liquid crystal compound is not disturbed.

<Sensitizer>

The sensitizer can accelerate the polymerization reaction of the polymerizable liquid crystal compound.

A preferable sensitizer is a photosensitizer. Examples of the sensitizer include xanthone and xanthone compounds such as thioxanthone (e.g., 2,4-diethylthioxanthone and 2-isopropylthioxanthone); anthracene and anthracene compounds such as alkoxy group-containing anthracene (e.g., dibutoxyanthracene); and phenothiazine and rubrene.

The content of the sensitizer is preferably 0.1 to 30 parts by mass, more preferably 0.5 to 10 parts by mass, still more preferably 0.5 to 8 parts by mass relative to 100 parts by mass of the polymerizable liquid crystal compound.

<Polymerization Inhibitor>

The polymerization inhibitor can control the degree of progress in the polymerization reaction of the polymerizable liquid crystal compound.

Examples of the polymerization inhibitor include radical scavengers such as phenol compounds, sulfur compounds, and phosphorus compounds.

Examples of phenol compounds include 2,6-di-tert-butyl-4-methylphenol, 2,6-di-tert-butyl-4-ethylphenol, butylhydroxyanisole, hydroquinone, alkoxy group-containing hydroquinone, alkoxy group-containing catechol (such as butyl catechol), and pyrogallol. Alternatively, commercially available products may be used; examples thereof include Sumilizer (registered trademark) BHT (2,6-di-t-butyl-4-methylphenol), Sumilizer GM (2-tert-butyl-6-(3-tert-butyl-2-hydroxy-5-methylbenzyl)-4-methylphenyl acrylate), Sumilizer GS (F) (2-[1-(2-hydroxy-3,5-di-tert-pentylphenyl)ethyl]-4,6-di-tert-pentylphenyl acrylate), and Sumilizer GA-80 (3,9-bis[2-[3-(3-tert-butyl-4-hydroxy-5-methylphenyl)propionyloxy]-1,1-dimethylethyl]-2,4,8,10-tetraoxaspiro[5.5]undecane) (all are manufactured by Sumitomo Chemical Co., Ltd.).

Examples of sulfur compounds include dialkyl thiodipropionates such as dilauryl thiodipropionate, dimyristyl thiodipropionate, and distearyl thiodipropionate; commercially available products such as Sumilizer TPL-R (dilauryl-3,3'-thiodipropionate) and Sumilizer TPM (dimyristyl-3,3'-thiodipropionate) (all are manufactured by Sumitomo Chemical Co., Ltd.).

Examples of phosphorus compounds include trioctyl phosphite, trilauryl phosphite, tridecyl phosphite, and (octyl) diphenyl phosphite; and commercially available products such as Sumilizer GP (6-[3-(3-tert-butyl-4-hydroxy-5-methylphenyl)propoxy]-2,4,8,10-tetra-tert-butyl-dibenzo[d,f][1,3,2]dioxaphosphepin) (manufactured by Sumitomo Chemical Co., Ltd.).

Preferable polymerization inhibitors are phenol compounds because these hardly cause coloring of the liquid crystal cured layer.

The content of the polymerization inhibitor is preferably 0.1 to 30 parts by mass, more preferably 0.5 to 10 parts by mass, still more preferably 0.5 to 8 parts by mass relative to 100 parts by mass of the polymerizable liquid crystal compound. At a content within this range, polymerization can be performed without disturbing the orientation of the polymerizable liquid crystal compound. These polymerization inhibitors may be used singly or in combinations of two or more.

<Leveling Agent>

The leveling agent adjusts the fluidity of the composition for forming a liquid crystal cured layer to prepare a flatter film obtained by applying the composition for forming a liquid crystal cured layer; examples thereof include surfactants. Preferable examples of the leveling agent include leveling agents containing polyacrylate compounds as main components and leveling agents containing fluorine atom-containing compounds as main components.

Examples of the leveling agents containing polyacrylate compounds as main components include "BYK-350," "BYK-352," "BYK-353," "BYK-354," "BYK-355," "BYK-358N," "BYK-361N," "BYK-380," "BYK-381," and "BYK-392" (BYK-Chemie GmbH).

Examples of leveling agents containing fluorine atom-containing compounds as main components include Megaface (registered trademark) R-08, R-30, R-90, F-410, F-411, F-443, F-445, F-470, F-471, F-477, F-479, F-482, and F-483" [DIC Corporation]; "Surflon (registered trademark) S-381, S-382, S-383, S-393, SC-101, and SC-105," "KH-40," and "SA-100" [AGC SEIMI CHEMICAL CO., LTD.]; "E1830" and "E5844" [DAIKIN INDUSTRIES, LTD.]; and Eftop (registered trademark) EF301, EF303, EF351, and EF352" [Mitsubishi Materials Electronic Chemicals Co., Ltd.].

The content of the leveling agent is preferably 0.01 to 5 parts by mass, more preferably 0.1 to 3 parts by mass relative to 100 parts by mass of the polymerizable liquid crystal compound. A content within this range is preferable because the polymerizable liquid crystal compound is readily horizontally oriented and the resulting liquid crystal cured layer is smoother. The composition for forming a liquid crystal cured layer may contain two or more leveling agents.

<Substrate>

The substrate according to the present embodiment has a surface roughness 1.0 nm or less in a field of view of 1 $\mu m^2$ of and has a water contact angle of 70° or more.

Examples of substrates include glass substrates and plastic substrates; the substrate is preferably a plastic substrate. Examples of plastics for forming plastic substrates include polyolefins such as polyethylene, polypropylene, and norbornene polymers; cyclic olefin resins; polyvinyl alcohols; polyethylene terephthalates; polymethacrylic acid esters; polyacrylic acid esters; cellulose esters such as triacetyl cellulose, diacetyl cellulose, and cellulose acetate propionate; polyethylene naphthalates; polycarbonates; polysulfones; polyethersulfone; polyether ketone; and polyphenylene sulfide and poly(phenylene oxide). Cellulose esters, cyclic olefin resins, polycarbonates, polyethylene terephthalates, or polymethacrylic acid esters are preferable. Polyethylene terephthalates are more preferable. The substrate according to the present embodiment preferably includes polyethylene terephthalates.

The cellulose ester is a cellulose having hydroxyl groups at least partially esterified, and is readily commercially available.

The cyclic olefin resin is composed of a polymer or copolymer (cyclic olefin resin) of a cyclic olefin such as norbornene and polycyclic norbornene monomers; the cyclic olefin resin may have a partially open ring. A cyclic olefin resin having an open ring may be hydrogenated. Furthermore, the cyclic olefin resin may be a copolymer of a cyclic olefin with a linear olefin or a vinylated aromatic compound (such as styrene) because transparency is not significantly impaired and moisture absorbing properties are not significantly enhanced. The cyclic olefin resin may have a polar group introduced into the molecule.

When the cyclic olefin resin is a copolymer of a cyclic olefin with a linear olefin or an aromatic compound having a vinyl group, the content of the structural unit derived from the cyclic olefin is usually 50 mol % or less, preferably in the range of 15 to 50 mol % relative to the total structural units of the copolymer. Examples of linear olefins include ethylene and propylene, and examples of aromatic compounds having a vinyl group include styrene, α-methylstyrene and alkyl-substituted styrene. When the cyclic olefin resin is a ternary copolymer of a cyclic olefin, a linear olefin and an aromatic compound having a vinyl group, the content of the structural unit derived from the linear olefin is usually 5 to 80 mol % relative to the total structural units of the copolymer and the content of the structural unit derived from the aromatic compound having a vinyl group is usually 5 to 80 mol % relative to the total structural units of the copolymer. Such a ternary copolymer is advantageous in that the amount of expensive cyclic olefin to be used can be relatively reduced in the preparation.

The substrate according to the present embodiment has a water contact angle of 70° or more. The water contact angle is preferably 70 to 90°, more preferably 75 to 80°.

When a substrate has a water contact angle of 70° or more, it is preferable from the viewpoint of facilitating the transfer of the optically anisotropic film, and enhancing application properties of a composition for forming a liquid crystal cured layer, an orienting polymer composition and a composition for forming a photo-orientation layer, described later respectively.

The water contact angle can be measured with a commercially available apparatus. In the present embodiment, the water contact angle indicates a value measured by a drop method. Examples of such an apparatus include DropMaster 700 manufactured by Kyowa Interface Science Co., Ltd. The measurement of the water contact angle may be performed according to JIS R 3257 (1999) "Testing method of wettability of glass substrate" with the amount of a solution to be dropped within the range of 1 µL or more and 4 µL or less.

The surface roughness at a field of view of 1 µm$^2$ of the substrate according to the present embodiment is 1.0 nm or less. The surface roughness is preferably 1.0 to 0.1 nm, more preferably 1.0 to 0.2 nm.

A substrate having a surface roughness of 1.0 nm or less in a field of view of 1 µm$^2$ facilitates the transfer of the optically anisotropic film, and can reduce defects during the transfer; therefore, such a surface roughness is preferred.

The surface roughness can be measured with a commercially available scanning probe microscope (SPM). In the present embodiment, the surface roughness indicates a value measured according to JIS R 1683 (2014) "Test method for surface roughness of ceramic thin films by atomic force microscopy." Examples of such an apparatus include SPA-300HV and SPI4000 manufactured by Hitachi High-Tech Science Corporation; the surface roughness can be measured at 3 points in a field of view of 1 µm$^2$ with Cantilever SI-DF20 (with an Al coat on the rear surface) to determine the average.

Such substrate is commercially available. Examples of commercially available substrates include DIAFOIL (registered trademark) T140 E25 manufactured by Mitsubishi Plastics, Inc.

The thickness of the substrate is preferably thin because a thin substrate can attain a weight of a product for practical use; a significantly thin substrate, however, reduces strength and processability. The thickness of the substrate is usually 5 to 300 µm, preferably 20 to 200 µm.

<Orientation Layer>

The optically anisotropic sheet according to the present embodiment preferably has an orientation layer between the substrate and the liquid crystal cured layer.

The orientation layer is prepared with a high-molecular compound, and has a thickness of 500 nm or less; the orientation layer has an orientation restraining force to orient the liquid crystals of the polymerizable liquid crystal compound in a desired direction.

The orientation layer facilitates the orientation of the liquid crystals of the polymerizable liquid crystal compound. The state of the orientation of the liquid crystals, such as horizontal orientation, vertical orientation, hybrid orientation and tilt orientation, varies depending on the characteristics of the orientation layer and the polymerizable liquid crystal compound, and the combination can be arbitrarily selected. The polymerizable liquid crystal compound can be horizontally oriented or hybrid-oriented by an orientation layer prepared with a material to give an orientation restraining force for the horizontal orientation, and can be vertically oriented or tilt-oriented by an orientation layer prepared with a material to give an orientation restraining force for the vertical orientation. The terms "horizontal" and "vertical" indicate directions of the long axes of the oriented polymerizable liquid crystal compound with respect to the plane of the liquid crystal cured layer. Namely, the vertical orientation indicates the long axes of the polymerizable liquid crystal compound oriented vertical to the plane of the liquid crystal cured layer. Through the specification, "vertical" indicates an angle formed by the long axes of the liquid crystals and the plane of the liquid crystal cured layer of 90°±20°.

In an orientation layer prepared with an orienting polymer, the orientation restraining force can be arbitrarily adjusted by the state of the surface of the layer or the rubbing condition thereof; in an orientation layer prepared with a photo-orienting polymer, the orientation restraining force can be arbitrarily adjusted by conditions on irradiation with polarized light or the like. The orientation of liquid crystals can also be controlled by selecting physical properties of the polymerizable liquid crystal compound such as surface tension and liquid crystallinity.

Preferably, the orientation layer formed between the substrate and the liquid crystal cured layer is insoluble in a solvent used in formation of the liquid crystal cured layer on the orientation layer, and has heat resistance against the heat treatment to remove the solvent or orient the liquid crystals. Examples of the orientation layer include orientation layers, photo-orientation layers, and groove-orientation layers composed of orienting polymers.

The thickness of the orientation layer is in the range of usually 10 to 500 nm, preferably 10 to 200 nm.

<Orientation Layer Composed of Orienting Polymer>

Examples of orienting polymers include polyamides and gelatins having an amide bond in the molecule; polyimides having an imide bond in the molecule and polyamic acid that is a hydrolyzed product of polyimide; polyvinyl alcohol; alkyl-modified polyvinyl alcohol; polyacrylamide; polyoxazole; polyethyleneimine; polystyrene; polyvinylpyrrolidone; polyacrylic acid; and polyacrylic acid esters; polyvinyl alcohol is preferable. These orienting polymers may be used singly or in combination.

The orientation layer prepared with an orienting polymer is usually prepared as follows: an orientinge polymer is dissolved in a solvent to prepare a composition (hereinafter sometimes referred to as an orienting polymer composition), the composition is applied to a substrate, and the solvent is removed to form a coating film; alternatively, the orienting polymer composition is applied to a substrate, the solvent is removed to form a coating film, and the coating film is rubbed (rubbing method).

Examples of the solvent include water; alcohol solvents such as methanol, ethanol, ethylene glycol, isopropyl alcohol, propylene glycol, methyl cellosolve, butyl cellosolve and propylene glycol monomethyl ether; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, methyl amyl ketone and methyl isobutyl ketone; aliphatic hydrocarbon solvents such as pentane, hexane and heptane; aromatic hydrocarbon solvents such as toluene and xylene; nitrile solvents such as acetonitrile; ether solvents such as tetrahydrofuran and dimethoxyethane; and chlorine-substituted hydrocarbon solvents such as chloroform and chlorobenzene. These solvents may be used singly or in combination.

The orienting polymer in the orienting polymer composition can be used at any concentration in the range such that the orienting polymer material is completely dissolved in the solvent; the concentration thereof in terms of the solid content is preferably 0.1 to 20%, more preferably 0.1 to 10% of the solution.

Examples of commercially available orienting polymer compositions include SUNEVER (registered trademark, manufactured by Nissan Chemical Industries, Ltd.) or OPTOMER (registered trademark, manufactured by JSR Corporation).

Examples of the method of applying the orienting polymer composition to the substrate include known application methods such as spin coating, extrusion, gravure coating, die coating, bar coating, and an applicator method, and known printing methods such as flexography.

The solvent contained in the orienting polymer composition is removed to form a dry coating film of the orienting polymer. Examples of the method of removing a solvent include spontaneous drying, air drying, heat drying, and drying under reduced pressure.

Examples of the rubbing method include a method of contacting a rotating rubbing roll with a rubbing cloth with the film of the orienting polymer formed on the surface of the substrate by application of the orienting polymer composition to the substrate and annealing.

<Photo-Orientation Layer>

The photo-orientation layer is usually prepared as follows: a composition comprising a polymer or monomer having a photoreactive group and a solvent (hereinafter sometimes referred to as a "composition for forming a photo-orientation layer") is applied to a substrate, and the coating is irradiated with polarized light (preferably, polarized UV). The photo-orientation layer is more preferable because the direction of the orientation restraining force can be arbitrarily controlled by selection of the polarization direction of the polarized light to be radiated.

The photoreactive group indicates a group having an ability to orient liquid crystals, which is demonstrated by irradiation with light. Specifically, the photoreactive group makes a photoreaction causing the ability to orient liquid crystals by irradiation with light, such as induction of orientation of molecules or an isomerization reaction, a dimerization reaction, a photo-crosslinking reaction, or a photodecomposition reaction. The photoreactive group which can make the reaction is preferably groups having an unsaturated bond, particularly a double bond, particularly preferably groups having at least one group selected from the group consisting of groups having a carbon-carbon double bond (C=C bond), groups having a carbon-nitrogen double bond (C=N bond), groups having a nitrogen-nitrogen double bond (N=N bond), and groups having a carbon-oxygen double bond (C=O bond).

Examples of the photoreactive groups having a C=C bond include a vinyl group, a polyene group, a stilbene group, a stilbazole group, a stilbazolium group, a chalcone group, and a cinnamoyl group. Examples of the photoreactive groups having a C=N bond include groups having an aromatic Schiff base and a structure such as that of aromatic hydrazone. Examples of the photoreactive groups having an N=N bond include an azobenzene group, an azonaphthalene group, an aromatic heterocyclic azo group, a bisazo group, a formazan group, and groups having azoxybenzene as a basic structure. Examples of the photoreactive groups having a C=O bond include a benzophenone group, a coumarin group, an anthraquinone group, and a maleimide group. These groups are optionally substituted by an alkyl group, an alkoxy group, an aryl group, an allyloxy group, a cyano group, an alkoxycarbonyl group, a hydroxyl group, a sulfonate group, and an alkyl halide group.

A preferable photoreactive group is a group involved in a photo-dimerization reaction or photo-crosslinking reaction because the orientability is high. Among these, a photoreactive group involved in a photo-dimerization reaction is preferable; a cinnamoyl group and a chalcone group are preferable because these groups need a relatively low irradiation intensity of the polarized light in photo-orientation and readily attain a photo-orientation layer having high thermal stability and high stability over time. Particularly preferably, a polymer having such a photoreactive group is a polymer having a cinnamoyl group in which the terminal of the side chain of the polymer has a cinnamic acid structure.

A solvent for the composition for forming a photo-orientation layer is preferably those which dissolve a polymer and a monomer having a photoreactive group; examples of the solvent include the solvents for the orienting polymer composition listed above.

The content of a polymer or monomer having a photoreactive group is preferably 0.2% by mass or more, particularly preferably in the range of 0.3 to 10% by mass of the composition for forming a photo-orientation layer. A polymer material such as polyvinyl alcohol and polyimide and a photosensitizer may be contained in the range so as not to significantly impair the properties of the photo-orientation layer.

Examples of the method of applying the composition for forming a photo-orientation layer to a substrate include the same methods as those of applying the orienting polymer composition to a substrate. Examples of the method of removing the solvent from the applied composition for forming a photo-orientation layer include the same methods as those of removing the solvent from the orienting polymer composition.

The irradiation with polarized light may be performed by any one of the followings methods; the solvent is removed from the composition for forming a photo-orientation layer applied onto the substrate, and the resulting coating is directly irradiated with polarized light, or the coating is irradiated with the polarized light emitted from the side of the substrate and transmitted through the substrate. Particularly preferably, the polarized light is substantially parallel light. The wavelength of the polarized light for irradiation is preferably within the range of the wavelength in which the photoreactive group in the polymer or monomer having a photoreactive group can absorb light energy. Specifically, ultraviolet light (UV) at a wavelength in the range of 250 to 400 nm is particularly preferable. Examples of light sources used in irradiation with the polarized light include xenon lamps, high pressure mercury lamps, ultra-high pressure mercury lamps, metal halide lamps, and ultraviolet light lasers such as KrF and ArF; high pressure mercury lamp, ultra-high pressure mercury lamps, and metal halide lamps are more preferable. These lamps are preferable because of their intensity of emitted ultraviolet light at a wavelength of 313 nm. Light from the light source is passed through a proper polarizer, and the resulting polarized light is irradiated. As such a polarizer, a polarizing filter, a polarizing prism such as Glan-Thompson polarizing prisms and Glan-Taylor polarizing prisms, or a grid type polarizer can be used.

Masking of the coating during the rubbing or irradiation with polarized light can form a plurality of regions (patterns) having different orientation directions of liquid crystals.

<Groove-Orientation Layer>

The groove-orientation layer has an uneven pattern or a plurality of grooves on the surface of the film. When a liquid crystal compound is disposed on a film having a plurality of linear grooves arranged at equal intervals, the liquid crystal molecules orient in the directions along the grooves.

Examples of the method of preparing a groove-orientation layer include a method of exposing the surface of a photosensitive polyimide film to light through a mask for exposure having patterned slits, developing and rinsing the film to form an uneven pattern; a method of forming a UV curable resin layer before curing on a plate-like base having grooves on the surface thereof, transferring the resin layer to a substrate, and curing the resin layer; and a method of pressing a roll-like base having a plurality of grooves against a film of a UV curable resin before curing formed on a substrate to form depressions and projections, and curing the UV curable resin. Specifically, examples thereof include the methods described in JP 6-34976 A and JP 2011-242743 A.

Among these methods, the method of pressing a roll-like base having a plurality of grooves against a film of a UV curable resin before curing formed on a substrate to form depressions and projections, and curing the UV curable resin is preferable. A preferable roll-like base is stainless steel (SUS) from the viewpoint of durability.

Examples of the UV curable resin include polymers of monofunctional acrylate, polymers of polyfunctional acrylate, or polymers of mixtures of these.

The term "monofunctional acrylate" refers to a compound having one group selected from the group consisting of an acryloyloxy group ($CH_2$=CH—COO—) and a methacryloyloxy group ($CH_2$=C($CH_3$)—COO—) (hereinafter sometimes referred to as a (meth)acryloyloxy group). The term "(meth)acrylate" indicates acrylate or methacrylate.

Examples of the monofunctional acrylate having one (meth)acryloyloxy group include alkyl(meth)acrylates having 4 to 16 carbon atoms, β-carboxyalkyl(meth)acrylates having 2 to 14 carbon atoms, alkylated phenyl(meth)acrylates having 2 to 14 carbon atoms, methoxypolyethylene glycol(meth)acrylate, phenoxypolyethylene glycol(meth)acrylate, and isobornyl(meth)acrylate.

The polyfunctional acrylate is a compound having two or more (meth)acryloyloxy groups; a compound having 2 to 6 (meth)acryloyloxy groups is preferable.

Examples of polyfunctional acrylates having two (meth) acryloyloxy groups include 1,3-butanediol di(meth)acrylate, 1,3-butanediol(meth)acrylate, 1,6-hexanediol di(meth)acrylate, ethylene glycol di(meth)acrylate, diethylene glycol di(meth)acrylate, neopentyl glycol di(meth)acrylate, triethylene glycol di(meth)acrylate, tetraethylene glycol di(meth) acrylate, polyethylene glycol diacrylate, bis(acryloyloxyethyl)ether of bisphenol A, ethoxylated bisphenol A di(meth) acrylate, propoxylated neopentyl glycol di(meth)acrylate, ethoxylated neopentyl glycol di(meth)acrylate, and 3-methylpentanediol di(meth)acrylate.

Examples of polyfunctional acrylates having 3 to 6 (meth) acryloyloxy groups include trimethylolpropane tri(meth) acrylate, pentaerythritol tri(meth)acrylate, tris(2-hydroxyethyl)isocyanurate tri(meth)acrylate, ethoxylated trimethylolpropane tri(meth)acrylate, propoxylated trimethylolpropane tri(meth)acrylate, pentaerythritol tetra(meth) acrylate, dipentaerythritol penta(meth)acrylate, dipentaerythritol hexa(meth)acrylate, tripentaerythritol tetra (meth)acrylate, tripentaerythritol penta(meth)acrylate, tripentaerythritol hexa(meth)acrylate, tripentaerythritol hepta(meth)acrylate, tripentaerythritol octa(meth)acrylate, reaction products of pentaerythritol tri(meth)acrylate and acid anhydrides, reaction products of dipentaerythritol penta(meth)acrylate and acid anhydrides, reaction products of tripentaerythritol hepta(meth)acrylate and acid anhydrides, caprolactone-modified trimethylolpropane tri(meth)acrylate, caprolactone-modified pentaerythritol tri(meth)acrylate, caprolactone-modified tris(2-hydroxyethyl)isocyanurate tri(meth)acrylate, caprolactone-modified pentaerythritol tetra(meth)acrylate, caprolactone-modified dipentaerythritol penta(meth)acrylate, caprolactone-modified dipentaerythritol hexa(meth)acrylate, caprolactone-modified tripentaerythritol tetra(meth)acrylate, caprolactone-modified tripentaerythritol penta(meth)acrylate, caprolactone-modified tripentaerythritol hexa(meth)acrylate, caprolactone-modified tripentaerythritol hepta(meth)acrylate, caprolactone-modified tripentaerythritol octa(meth)acrylate, reaction products of caprolactone-modified pentaerythritol tri(meth) acrylate and acid anhydrides, reaction products of caprolactone-modified dipentaerythritol penta(meth)acrylate and acid anhydrides, and reaction products of caprolactone-modified tripentaerythritol hepta(meth)acrylate and acid anhydrides.

The term "caprolactone-modified" indicates that an open ring of caprolactone or a ring-opening polymerized product thereof is introduced between an alcohol-derived site of a (meth)acrylate compound and a (meth)acryloyloxy group.

Examples of commercially available products of polyfunctional acrylate include A-DOD-N, A-HD-N, A-NOD-N, APG-100, APG-200, APG-400, A-GLY-9E, A-GLY-20E, A-TMM-3, A-TMPT, AD-TMP, ATM-35E, A-TMMT, A-9550, A-DPH, HD-N, NOD-N, NPG, and TMPT [Shin-Nakamura Chemical Co., Ltd.]; "ARONIX M-220, M-325, M-240, M-270, M-309, M-310, M-321, M-350, M-360, M-305, M-306, M-450, M-451, M-408, M-400, M-402, M-403, M-404, M-405, and M-406" [TOAGOSEI CO., LTD.]; and "EBECRYL 11, 145, 150, 40, 140, and 180," DPGDA, HDDA, TPGDA, HPNDA, PETIA, PETRA, TMPTA, TMPEOTA, DPHA, and EBECRYL series [DAICEL-ALLNEX LTD.].

To attain orientation with reduced disturbance in orientation, the projection portion of the groove-orientation layer preferably has a width of 0.05 to 5 μm, and the depression portion preferably has a width of 0.1 to 5 μm; the difference between the depression and the projection is preferably 2 μm or less, more preferably, 0.01 to 1 μm.

<Optically Anisotropic Film>

The substrate can be removed from the optically anisotropic sheet according to the present embodiment to prepare an optically anisotropic film including the liquid crystal cured layer or the orientation layer and the liquid crystal cured layer.

<Transfer>

The liquid crystal cured layer included in the optically anisotropic sheet according to the present embodiment can be transferred to a receiver. Examples of the method of transferring the liquid crystal cured layer include a method of laminating a liquid crystal cured layer to a receiver via an adhesive layer, and removing a substrate included in an optically anisotropic sheet. The liquid crystal cured layer is transferred by following steps, for example.

A step of forming an adhesive layer made of an active energy ray-curing adhesive on the surface of the liquid crystal cured layer of in the optically anisotropic sheet for transfer according to the present embodiment.

A step of laminating a receiver on the adhesive layer.

A step of the irradiation with an active energy ray to the adhesive layer.

A step of removing the substrate of the optically anisotropic sheet for transfer according to the present embodiment.

The adhesive layer may be formed on the liquid crystal cured layer or a receiver. When an orientation layer is disposed between the substrate and the liquid crystal cured layer, the substrate and the orientation layer may be removed at the same time.

The substrate has the functional group forming a chemical bond with the liquid crystal cured layer, the orientation layer, or the like on the surface of the substrate; due to such a chemical bond with the liquid crystal cured layer, the orientation layer, or the like, the substrate is difficult to remove. Accordingly, for removal of the substrate by peeling, a substrate having a small amount of the functional group on the surface of the substrate is preferable, and a substrate not surface treated for formation of the functional group on the surface of the substrate is preferable.

The orientation layer having the functional group forming a chemical bond with the substrate tend to have a larger adhesion force between the substrate and the orientation layer, and therefore, when the substrate is peeled to remove, an orientation layer having less functional group forming a chemical bond with the substrate is preferable. The orientation layer does not contain any reagent that crosslinks the substrate to the orientation layer; more preferably, the solution for the orienting polymer composition, the composition for forming a photo-orientation layer, and the like does not contain any component that dissolves the substrate, such as solvents.

An orientation layer having a functional group forming a chemical bond with the liquid crystal cured layer tend to have a larger adhesion force between the liquid crystal cured layer and the orientation layer. Therefore, when the orientation layer is removed along with the substrate, the orientation layer having less functional group forming a chemical bond with the liquid crystal cured layer is preferable. The liquid crystal cured layer and the orientation layer do not contain any reagent that crosslinks the liquid crystal cured layer and the orientation layer.

A liquid crystal cured layer having a functional group forming a chemical bond with the substrate or the orientation layer tend to have a larger adhesion force between either the substrate or the orientation layer and the liquid crystal cured layer. Therefore, when the substrate or the orientation layer is removed along with the substrate, the liquid crystal cured layer having less functional group forming a chemical bond with the substrate or the orientation layer is preferable. The polymerizable liquid crystal composition does not contain any reagent that crosslinks the substrate or the orientation layer with the liquid crystal cured layer.

<Adhesive Layer>

The adhesive layer is formed of an adhesive.

Examples of adhesives include pressure-sensitive adhesives, drying curing type adhesives, and chemically reactive adhesives. Examples of chemically reactive adhesives include active energy ray-curable adhesives.

<Pressure-Sensitive Adhesive>

The pressure-sensitive adhesive usually contains a polymer, and may contain a solvent.

Examples of the polymer include acrylic polymers, silicone polymers, polyester, polyurethane, or polyether. Among these, acrylic pressure-sensitive adhesives containing acrylic polymers are preferable because these have high optical transparency, mild wettability, a mild aggregation force, high adhesion properties, high weatherability, and high heat resistance, and barely generate float, peel-off, or the like under heating conditions or humidifying conditions.

A preferable acrylic polymer is a copolymer of (meth)acrylate in which the alkyl group of the ester portion is an alkyl group having 1 to 20 carbon atoms such as a methyl group, an ethyl group or a butyl group (hereinafter acrylate and methacrylate are sometimes referred to collectively as (meth)acrylate, and acrylic acid and methacrylic acid are sometimes referred to collectively as (meth)acrylic acid) with a (meth)acrylic monomer having a functional group such as (meth)acrylic acid and hydroxyethyl(meth)acrylate.

The pressure-sensitive adhesive comprising such a copolymer is preferable because the pressure-sensitive adhesive has high tackiness, and allows the film laminated to display devices to be relatively readily removed without leaving traces of a glue or the like in the display devices when the film is removed. The glass transition temperature of the acrylic polymer is preferably 25° C. or less, more preferably 0° C. or less. The weight average molecular weight of such an acrylic polymer is preferably 100000 or more.

Examples of the solvent include the same solvents as those listed as the solvent for an orienting polymer composition.

The pressure-sensitive adhesive may contain a light diffusing agent. The light diffusing agent gives photo-diffusibility to the pressure-sensitive adhesive; the light diffusing agent may be any fine particle having a refractive index different from that of the polymer contained in the pressure-sensitive adhesive; examples of the light diffusing agent include fine particles of inorganic compounds and fine particles of organic compounds (polymers). Most of the polymers contained in the pressure-sensitive adhesive as effective components including the acrylic polymer have refractive indices of about 1.4; accordingly, a light diffusing agent having a refractive index of 1 to 2 may be properly selected. The difference in the refractive index between the polymers contained in the pressure-sensitive adhesive as effective components and the light diffusing agent is usually 0.01 or more, suitably 0.01 to 0.5 from the viewpoint of the brightness of the display device and display properties. The fine particle used as the light diffusing agent preferably has a spherical shape close to a monodisperse, and a fine particle having an average particle size of 2 to 6 μm is preferable.

The refractive index is usually measured by a minimum deviation method or an Abbe refractometer.

Examples of fine particles of inorganic compounds include aluminum oxide (refractive index: 1.76) and silicon oxide (refractive index: 1.45).

Examples of fine particles of organic compounds (polymers) include melamine beads (refractive index: 1.57), polymethyl methacrylate beads (refractive index: 1.49), methyl methacrylate/styrene copolymer resin beads (refractive index: 1.50 to 1.59), polycarbonate beads (refractive index: 1.55), polyethylene beads (refractive index: 1.53), polystyrene beads (refractive index: 1.6), polyvinyl chloride beads (refractive index: 1.46), and silicone resin beads (refractive index: 1.46).

The content of the light diffusing agent is usually 3 to 30 parts by mass relative to 100 parts by mass of the polymer.

The haze value of the adhesive layer formed of the pressure-sensitive adhesive having the light diffusing agent dispersed therein is preferably in the range of 20 to 80% to ensure the brightness of the display device and reduce the blurring and unsharpness of displayed images. The haze value is a value represented by a formula [(diffused transmittance/total light transmittance)×100(%)], which is measured according to JIS K 7105.

The thickness of the adhesive layer formed of the pressure-sensitive adhesive, which is determined according to the adhesive force or the like, is usually 1 to 40 μm. The thickness is preferably 3 to 25 μm from the viewpoint of processability, durability, and the like. If the thickness of the adhesive layer formed of the pressure-sensitive adhesive is 3 to 15 μm, the brightness of the display device when viewed from the front or side of the display device can be kept, and the blurring and unsharpness of displayed images can be reduced.

<Drying Curing Type Adhesive>

The drying curing type adhesive may contain a solvent.

Examples of the drying curing type adhesive include compositions comprising a polymer of a monomer having a protic functional group such as a hydroxyl group, a carboxy group or an amino group and an ethylenic unsaturated group, or urethane resin as the main component, and further comprising a crosslinking agent or a curable compound such as polyaldehyde, epoxy compounds, epoxy resins, melamine compounds, zirconia compounds and zinc compounds.

Examples of the polymer of a monomer having a protic functional group such as a hydroxyl group, a carboxy group or an amino group and an ethylenic unsaturated group include ethylene-maleic acid copolymers, itaconic acid copolymers, acrylic acid copolymers, acrylamide copolymers, saponified products of polyvinyl acetate, and polyvinyl alcohol resins.

Examples of the polyvinyl alcohol resins include polyvinyl alcohol, partially saponified polyvinyl alcohol, completely saponified polyvinyl alcohol, carboxyl group-modified polyvinyl alcohol, acetoacetyl group-modified polyvinyl alcohol, methylol group-modified polyvinyl alcohol, and amino group-modified polyvinyl alcohol. The content of the polyvinyl alcohol resin in an aqueous adhesive is usually 1 to 10 parts by mass, preferably 1 to 5 parts by mass relative to 100 parts by mass of water.

Examples of the urethane resin include polyester-based ionomer urethane resins. Through the specification, the polyester-based ionomer urethane resin is a urethane resin having a polyester skeleton into which a small amount of an ionic component (hydrophilic component) is introduced. Such an ionomer urethane resin is emulsified in water into an emulsion without using any emulsifier, and can be formed into an aqueous adhesive. When the polyester-based ionomer urethane resin is used, compounding of a water-soluble epoxy compound as a crosslinking agent is effective.

Examples of the epoxy resin include polyamide epoxy resins prepared by a reaction of epichlorohydrin with polyamide polyamine prepared by a reaction of polyalkylene polyamine such as diethylenetriamine or triethylenetetramine with dicarboxylic acid such as adipic acid. Examples of commercially available products of such polyamide epoxy resins include "SUMIREZ resin (registered trademark) 650" and "SUMIREZ resin 675" manufactured by Sumika Chemtex Company, Limited, and "WS-525" manufactured by JAPAN PMC CORPORATION. If compounded, the amount of the epoxy resin to be added is usually 1 to 100 parts by mass, preferably 1 to 50 parts by mass relative to 100 parts by mass of the polyvinyl alcohol resin.

The thickness of the adhesive layer formed of the drying curing type adhesive is usually 0.001 to 5 μm, preferably 0.01 to 2 μm, still more preferably 1 μm or less. A significantly thick adhesive layer formed of the drying curing type adhesive readily results in a poor appearance of the optically anisotropic film.

<Active Energy Ray-Curable Adhesive>

The active energy ray-curable adhesive may contain a solvent.

The active energy ray-curable adhesive is cured when irradiated with an active energy ray.

Examples of the active energy ray-curable adhesive include cationic polymerizable adhesives comprising an epoxy compound and a cationic polymerization initiator; radical polymerizable adhesives comprising an acrylic curable component and a radical polymerization initiator; adhesives comprising a cationic polymerizable curable component such as an epoxy compound, a radical polymerizable curable component such as an acrylic compound, and a cationic polymerization initiator and a radical polymerization initiator; and adhesives curable when irradiated with an electron beam without containing a polymerization initiator. Among these active energy ray-curable adhesives, a preferable radical polymerizable adhesive is a radical polymerizable adhesive comprising an acrylic curable component and a radical polymerization initiator. A cation-polymerizable and active energy ray-curing adhesive which is usable with substantial no solvent including an epoxy compound and a cation-polymerization initiator is preferably.

Examples of the epoxy compound include glycidyl etherified products of an aromatic compound or a linear compound having a hydroxyl group; glycidyl aminated products of a compound having an amino group; epoxidized products of a linear compound having a C—C double bond; and alicyclic epoxy compounds having a saturated carbon ring bonded to a glycidyloxy group or an epoxyethyl group directly or through alkylene or having a saturated carbon ring directly bonded to an epoxy group. These epoxy compounds may be used singly or in combination. Among these, alicyclic epoxy compounds are preferable because of their high cationic polymerizability.

Examples of commercially available products of the epoxy compound include "jER" series manufactured by Mitsubishi Chemical Corporation, "EPICLON (registered trademark)" manufactured by DIC Corporation, "EPOTOHTO (registered trademark)" manufactured by Tohto Kasei Co., Ltd., "Adeka Resin (registered trademark)" manufactured by Adeka Corporation, "Denacol (registered trademark)" manufactured by Nagase ChemteX Corporation, "Dow Epoxy" manufactured by The Dow Chemical Company, and "TEPIC (registered trademark)" manufactured by Nissan Chemical Industries, Ltd. Examples of alicyclic epoxy compounds include "Celloxide (registered trademark)" series and "Cyclomer (registered trademark)" manufactured by Daicel Corporation, and "CYRACURE (registered trademark) UVR" series manufactured by The Dow Chemical Company.

The active energy ray-curable adhesive containing an epoxy compound may further contain a compound other than the epoxy compound. Examples of the compound other than the epoxy compound include oxetane compounds and acrylic compounds. Among these, an oxetane compound is preferably used in combination because the compound can accelerate the curing rate during the cationic polymerization.

Examples of the oxetane compound include "Aron Oxetane (registered trademark)" series manufactured by TOAGOSEI CO., LTD. and "ETERNACOLL (registered trademark)" series manufactured by Ube Industries, Ltd.

The active energy ray-curable adhesive comprising an epoxy compound and an oxetane compound is preferably used without any solvent.

The cationic polymerization initiator is a compound that generates a cation species when irradiated with an active energy ray such as ultraviolet light; examples thereof include onium salts such as aromatic diazonium salts, aromatic iodonium salts, and aromatic sulfonium salts; and iron-arene complexes. These cationic polymerization initiators may be used singly or in combination.

Examples of commercially available products of the cationic polymerization initiator include "KAYARAD (registered trademark)" series manufactured by NIPPON KAYAKU Co., Ltd., "CYRACURE UVI" series manufactured by The Dow Chemical Company, "CPI" series manufactured by San-Apro Ltd., "TAZ," "BBI," and "DTS" manufactured by Midori Kagaku Co., Ltd., "Adeka OPTOMER" series manufactured by Adeka Corporation, and "RHODORSIL (registered trademark)" manufactured by Rhodia S.A.

The content of the cationic polymerization initiator is usually 0.5 to 20 parts by mass, preferably 1 to 15 parts by mass relative to 100 parts by mass of the active energy ray-curable adhesive.

Examples of the acrylic curable component include (meth)acrylate such as methyl(meth)acrylate and hydroxyethyl(meth)acrylate, and (meth)acrylic acid.

Examples of the radical polymerization initiator include hydrogen abstracting photoradical generators and cleaving photoradical generators.

Examples of the hydrogen abstracting photoradical generator include naphthalene derivatives such as 1-methylnaphthalene, anthracene derivatives, pyrene derivatives, carbazole derivatives, benzophenone derivatives, thioxanthone derivatives, and coumarin derivatives.

Examples of the cleaving photoradical generator include benzoin ether derivatives, arylalkyl ketones such as acetophenone derivatives, oxime ketones, acyl phosphine oxides, thiobenzoic acid S-phenyls, titanocenes, and derivatives thereof having higher molecular weights.

Among these cleaving photoradical generators, acyl phosphine oxides are preferable, and specifically trimethylbenzoyldiphenylphosphine oxide (trade name "DAROCURE TPO," BASF Japan Ltd.), bis(2,6-dimethoxy-benzoyl)-(2,4,4-trimethyl-pentyl)-phosphine oxide (trade name "CGI 403," BASF Japan Ltd.), or bis(2,4,6-trimethylbenzoyl)-2,4-dipentoxyphenylphosphine oxide (trade name "Irgacure 819," BASF Japan Ltd.) are preferable.

The active energy ray-curable adhesive may contain a sensitizer.

The content of the sensitizer is preferably 0.1 to 20 parts by mass relative to 100 parts by mass of the active energy ray-curable adhesive.

The active energy ray-curable adhesive may further contain an ion trapping agent, an antioxidant, a chain transfer agent, a tackifier, a thermoplastic resin, a filler, a flow control agent, a plasticizer, and an antifoaming agent.

The active energy ray in the present embodiment is defined as an energy ray that can decompose a compound generating an active species to generate the active species. Examples of such an active energy ray include visible light, ultraviolet light, infrared radiation, X rays, $\alpha$ rays, $\beta$ rays, $\gamma$ rays, and electron beams; ultraviolet light and electron beams are preferable.

The accelerating voltage of the electron beam to be radiated is usually 5 to 300 kV, preferably 10 to 250 kV. The exposure dose is usually 5 to 100 kGy, preferably 10 to 75 kGy.

The irradiation with the electron beam is usually performed in an inert gas, or may be performed in the air or under conditions where oxygen is slightly introduced.

The intensity of the ultraviolet light to be radiated is usually 10 to 5000 mW/cm$^2$. The intensity of the ultraviolet light to be radiated is preferably an intensity in a wavelength region which is effective in activation of the cationic polymerization initiator or the radical polymerization initiator. Preferably, when the adhesive is irradiated with the light having such an intensity one or several times, the amount of accumulated light is 10 mJ/cm$^2$ or more, preferably 10 to 5000 mJ/cm$^2$.

Examples of light sources for ultraviolet light include low pressure mercury lamps, middle pressure mercury lamps, high pressure mercury lamps, ultra-high pressure mercury lamps, xenon lamps, halogen lamps, carbon arc lamps, tungsten lamps, gallium lamps, excimer lasers, LED light sources emitting light having a wavelength in the range of 380 to 440 nm, chemical lamps, blacklight lamps, microwave excited mercury lamps, and metal halide lamps.

Examples of the solvent include water; alcohols such as methanol, ethanol, isopropyl alcohol, 1-butanol, 2-butanol, sec-butyl alcohol, tert-butyl alcohol, ethylene glycol, propylene glycol and butanediol; saturated aliphatic ether compounds such as propyl ether, isopropyl ether, butyl ether, isobutyl ether, n-amyl ether, isoamyl ether, methyl butyl ether, methyl isobutyl ether, methyl n-amyl ether, methyl isoamyl ether, ethyl propyl ether, ethyl isopropyl ether, ethyl butyl ether, ethyl isobutyl ether, ethyl n-amyl ether and ethyl isoamyl ether; unsaturated aliphatic ether compounds such as allyl ether and ethyl allyl ether; aromatic ether compounds such as anisole, phenetole, phenyl ether and benzyl ether; cyclic ether compounds such as tetrahydropyran, tetrahydropyran, and dioxane; ethylene glycol ether compounds such as ethylene glycol monomethyl ether, ethylene glycol monoethyl ether, ethylene glycol monobutyl ether, diethylene glycol monomethyl ether, diethylene glycol monoethyl ether and diethylene glycol monobutyl ether; monocarboxylic acid compounds such as formic acid, acetic acid, acetic anhydride, acrylic acid, citric acid, propionic acid and butyric acid; organic acid ester compounds such as butyl formate, amyl formate, propyl acetate, isopropyl acetate, butyl acetate, secondary butyl acetate, amyl acetate, isoamyl acetate, 2-ethylhexyl acetate, cyclohexyl acetate, butylcyclohexyl acetate, ethyl propionate, butyl propionate, amyl propionate, butyl butyrate, diethyl carbonate, diethyl oxalate, methyl lactate, ethyl lactate, butyl lactate and triethyl phosphate; ketone compounds such as acetone, ethyl ketone, propyl ketone, butyl ketone, methyl isopropyl ketone, methyl isobutyl ketone, diisobutyl ketone, acetylacetone, diacetone alcohol, cyclohexanone, cyclopentanone, methylcyclohexanone and cycloheptanone; dicarboxylic acid compounds such as succinic acid, glutaric acid, adipic acid, undecanedioic acid, pyruvic acid and citraconic acid; and 1,4-dioxane, furfural, and N-methylpyrrolidone.

Among these, water and alcohols are preferable, alcohols having 1 to 4 carbon atoms are more preferable, at least one alcohol selected from the group consisting of methanol, ethanol, isopropyl alcohol, 1-butanol, 2-butanol, sec-butyl alcohol, tert-butyl alcohol, ethylene glycol, propylene glycol and butanediol is still more preferable, and isopropyl alcohol and/or 1-butanol is further still more preferable.

Water may be pure water, or may contain as many impurities as tap water.

The thickness of the adhesive layer formed of the active energy ray-curable adhesive is usually 0.001 to 5 μm, preferably 0.01 μm or more, preferably 4 μm or less, more preferably 3 μm or less. A significantly thick adhesive layer formed of the active energy ray-curable adhesive readily results in a poor appearance of the optically anisotropic film.

<Receiver>

Examples of the receiver include the same as the substrates described above, polarizers, polarizing plates, and display devices. When the liquid crystal cured layer of the optically anisotropic sheet according to the present embodiment is transferred to the receiver, a laminate is obtained.

<Polarizer and Polarizing Plate>

The polarizer polarizes light. Examples of the polarizer include stretched films that adsorb a dye having absorption anisotropy or films to which a dye having absorption anisotropy is applied. Examples of the dye having absorption anisotropy include dichroic dyes.

The stretched film that adsorbs a dye having absorption anisotropy is prepared usually through a step of monoaxially stretching a polyvinyl alcohol resin film, a step of dyeing the polyvinyl alcohol resin film with a dichroic dye to allow the film to adsorb the dichroic dye, a step of treating the polyvinyl alcohol resin film adsorbing the dichroic dye in a aqueous solution of boric acid, and a step of washing the film with water after the treatment with the aqueous solution of boric acid.

The polyvinyl alcohol resin is obtained by saponifying a polyvinyl acetate resin. Examples of the polyvinyl acetate resin include a homopolymer of vinyl acetate, i.e., polyvinyl acetate, and copolymers of vinyl acetate and other monomers copolymerizable with vinyl acetate. Examples of other monomers copolymerizable with vinyl acetate include unsaturated carboxylic acid, olefins, vinyl ethers, unsaturated sulfonic acids, and acrylamides having an ammonium group.

The degree of saponification of the polyvinyl alcohol resin is usually 85 to 100 mol %, preferably 98 mol % or more. The polyvinyl alcohol resin may be modified, and polyvinyl formal and polyvinyl acetal modified with aldehydes can also be used. The degree of polymerization of the polyvinyl alcohol resin is in the range of usually 1000 to 10000, preferably 1500 to 5000.

Such a polyvinyl alcohol resin is formed into a film to obtain a material film for a polarizer. The polyvinyl alcohol resin can be formed into a film by any known method. The thickness of the polyvinyl alcohol material film is preferably 10 to 150 µm.

The polyvinyl alcohol resin film can be monoaxially stretched before dyeing with a dichroic dye, simultaneously with the dyeing, or after the dyeing. When the monoaxial stretching is performed after the dyeing, the monoaxial stretching may be performed before or during the treatment with boric acid. The monoaxial stretching can be performed in a plurality of stages through these steps. In the monoaxial stretching, the film may be monoaxially stretched between rolls having different circumferential speeds, or may be monoaxially stretched with a heat roll. The monoaxial stretching may be dry stretching performed in the air, or may be wet stretching performed by swelling a polyvinyl alcohol resin film with a solvent. The draw ratio is usually 3 to 8 times.

The polyvinyl alcohol resin film is dyed with a dichroic dye by a method of immersing a polyvinyl alcohol resin film in an aqueous solution containing a dichroic dye.

Examples of the dichroic dye include iodine and dichroic organic dyes. Examples of dichroic organic dyes include dichroic direct dyes comprising disazo compounds such as C.I. DIRECT RED 39, and dichroic direct dyes comprising compounds such as trisazo and tetrakisazo. Preferably, the polyvinyl alcohol resin film is immersed in water before the dyeing.

When the dichroic dye is iodine, usually a method of immersing a polyvinyl alcohol resin film in an aqueous solution of iodine and potassium iodide to dye the film is used. The content of iodine in the aqueous solution is usually 0.01 to 1 part by mass relative to 100 parts by mass of water. The content of potassium iodide is usually 0.5 to 20 parts by mass relative to 100 parts by mass of water. The temperature of the aqueous solution used in the dyeing is usually 20 to 40° C. The time for immersion in the aqueous solution (dyeing time) is usually 20 to 1800 seconds.

When the dichroic dye is a dichroic organic dye, usually a method of immersing a polyvinyl alcohol resin film in an aqueous solution of a water-soluble dichroic dye to dye the film is used. The content of the dichroic organic dye in the aqueous solution is usually $1 \times 10^{-4}$ to 10 parts by mass, preferably $1 \times 10^{-3}$ to 1 part by mass, more preferably $1 \times 10^{-3}$ to $1 \times 10^{-2}$ parts by mass relative to 100 parts by mass of water. The aqueous solution may contain an inorganic salt such as sodium sulfate as a dyeing aid. The temperature of the aqueous solution is usually 20 to 80° C. The time for immersion in the aqueous solution (dyeing time) is usually 10 to 1800 seconds.

After the dyeing with the dichroic dye, the treatment with boric acid can be usually performed by a method of immersing the dyed polyvinyl alcohol resin film in an aqueous solution of boric acid. The content of boric acid in the aqueous solution of boric acid is usually 2 to 15 parts by mass, preferably 5 to 12 parts by mass relative to 100 parts by mass of water. When iodine is used as the dichroic dye, the aqueous solution of boric acid preferably contains potassium iodide; the content of potassium iodide is usually 0.1 to 15 parts by mass, preferably 5 to 12 parts by mass relative to 100 parts by mass of water. The time for immersion in the aqueous solution of boric acid is usually 60 to 1200 seconds, preferably 150 to 600 seconds, still more preferably 200 to 400 seconds. The temperature during the treatment with boric acid is usually 50° C. or more, preferably 50 to 85° C., more preferably 60 to 80° C.

After the treatment with boric acid, the polyvinyl alcohol resin film is usually washed with water. The washing with water can be performed by a method of immersing the polyvinyl alcohol resin film treated with boric acid in water. The temperature of water during washing with water is usually 5 to 40° C., The immersion time is usually 1 to 120 seconds.

After the washing with water, the film is dried to obtain a polarizer. The film can be dried with a hot air dryer or a far-infrared heater. The drying temperature is usually 30 to 100° C., preferably 50 to 80° C. The drying time is usually 60 to 600 seconds, preferably 120 to 600 seconds. The moisture percentage of the polarizer is reduced to a practical level by the drying. The moisture percentage is usually 5 to 20% by mass, preferably 8 to 15% by mass. At a moisture percentage of less than 5% by mass, the polarizer may lose flexibility to be damaged or broken after the drying. At a moisture percentage of more than 20% by mass, the polarizer may have poor thermal stability.

The polarizer, which is obtained by subjecting the polyvinyl alcohol resin film to the monoaxial stretching, the dyeing with the dichroic dye, the treatment with boric acid, the washing with water, and the drying as described above, has a thickness of preferably 5 to 40 µm.

Examples of the films to which a dye having absorption anisotropy is applied include films obtained by applying a composition comprising a liquid crystalline dichroic dye or a composition comprising a dichroic dye and polymerizable liquid crystals.

While the film to which the dye having absorption anisotropy is applied is preferably thinner, however a significantly thin film will reduce the strength and the processability. The thickness of the film is usually 20 µm or less, preferably 5 µm or less, more preferably 0.5 to 3 µm.

Specific examples of the film to which the dye having absorption anisotropy is applied include films described in JP 2012-33249 A.

A transparent protective film is laminated at least one surface of the polarizer with an adhesive to obtain a polarizing plate. A preferable transparent protective film is the transparent film as the substrate described above.

<Method of Preparing Optically Anisotropic Sheet>

The composition for forming a liquid crystal cured layer is applied to the surface of the substrate or the surface of the orientation layer formed on the substrate. Examples of the application method include the same methods as those listed as the method of applying an orienting polymer composition to a substrate. The thickness of the composition for forming a liquid crystal cured layer to be applied is determined in consideration of the thickness of the resulting liquid crystal cured layer.

Next, the solvent contained in the composition for forming a liquid crystal cured layer is removed under a condition where the polymerizable liquid crystal compound is not polymerized, thereby forming a dry coating film of the composition for forming a liquid crystal cured layer on the surface of the substrate or the orientation layer. Examples of the method of removing a solvent include spontaneous drying, air drying, heat drying, and drying under reduced pressure.

The liquid crystals of the polymerizable liquid crystal compound contained in the dry coating film are oriented by heating the dry coating film or the like; then, while the orientation of the liquid crystals is being kept, the dry coating film is irradiated with energy to polymerize the polymerizable liquid crystal compound. When the composition for forming a liquid crystal cured layer contains a polymerization initiator, the dry coating film is preferably irradiated with energy under a condition where the polymerization initiator is activated. When the polymerization initiator is a photopolymerization initiator, the energy is preferably light. The light to be radiated is properly selected according to the type of the polymerization initiator contained in the dry coating film, or the type of the polymerizable liquid crystal compound (particularly, the type of the polymerization group included in the polymerizable liquid crystal compound) and the amount thereof. Examples of such light include light and active electron beams selected from the group consisting of visible light, ultraviolet light and laser beams. Among these, ultraviolet light is preferable because the progress of the polymerization reaction is readily controlled and polymerization apparatuses widely used in the field can be used. Accordingly, it is preferable that the types of the polymerizable liquid crystal compound and the polymerization initiator contained in the composition for forming a liquid crystal cured layer be selected so as to allow polymerization with ultraviolet light. In the polymerization, the dry coating film is preferably cooled with a proper cooling device during irradiation with ultraviolet light to control the polymerization temperature. By performing such cooling, a liquid crystal cured layer can be suitably prepared with a polymerizable liquid crystal compound polymerized at a lower temperature even if a substrate having a lower heat resistance is used.

Thus, a liquid crystal cured layer having oriented liquid crystals is formed on the surface of the substrate or the orientation layer.

<Primer Layer>

A primer layer may be disposed on the surface of the resulting liquid crystal cured layer.

The primer layer usually contains a transparent resin, and is formed of a transparent resin solution. The primer layer can reduce defects generated on the liquid crystal cured layer in formation of the adhesive layer. A preferable transparent resin is those having high applicability and exhibiting high transparency and adhesion after formed into the primer layer.

The solvent for the transparent resin solution is selected according to the solubility of the transparent resin. Examples of the solvent include aromatic hydrocarbon solvents such as benzene, toluene and xylene; ketone solvents such as acetone, methyl ethyl ketone and methyl isobutyl ketone; ester solvents such as ethyl acetate and isobutyl acetate; chlorinated hydrocarbon solvents such as methylene chloride, trichloroethylene and chloroform; and alcohol solvents such as ethanol, 1-propanol, 2-propanol and 1-butanol. Water is preferable because a transparent resin solution containing an organic solvent used in formation of the primer layer may affect the optical properties of the liquid crystal cured layer.

Examples of the transparent resin include epoxy resins. The epoxy resin may be a one-component curable type or a two-component curable type. A water-soluble epoxy resin is particularly preferable. Examples of the water-soluble epoxy resin include polyamide epoxy resins obtained by a reaction of epichlorohydrin with polyamide polyamine obtained by a reaction of polyalkylene polyamine such as diethylenetriamine and triethylenetetramine with dicarboxylic acid such as adipic acid. Examples of commercially available products of such polyamide epoxy resins include SUMIREZ resin 650(30) and SUMIREZ resin 675 available from Sumika Chemtex Company, Limited.

When the transparent resin is a water-soluble epoxy resin, another water-soluble resin such as polyvinyl alcohol resins is preferably used in combination to enhance the applicability more significantly. The polyvinyl alcohol resin may be a modified polyvinyl alcohol resin such as partially saponified polyvinyl alcohol, completely saponified polyvinyl alcohol, carboxyl group-modified polyvinyl alcohol, acetoacetyl group-modified polyvinyl alcohol, methylol group-modified polyvinyl alcohol, and amino group-modified polyvinyl alcohol. Suitable examples of commercially available products of the polyvinyl alcohol resins include anionic group-containing polyvinyl alcohol KL-318 (trade name) available from Kuraray Co., Ltd.

When the primer layer is formed of a solution containing the water-soluble epoxy resin, the content of the epoxy resin is preferably 0.2 to 1.5 parts by mass relative to 100 parts by mass of water. When the polyvinyl alcohol resin is compounded with the solution, the amount thereof is preferably 1 to 6 parts by mass relative to 100 parts by mass of water. The thickness of the primer layer is preferably 0.1 to 10 µm.

The primer layer can be formed by any method, and known various coating methods such as a direct gravure method, a reverse gravure method, die coating, comma coating, and bar coating can be used.

<Adhesive Layer>

An adhesive layer may be formed on the surface of the resulting liquid crystal cured layer or the primer layer. The adhesive layer is formed by applying an adhesive to the surface of the liquid crystal cured layer or the primer layer. When the adhesive contains a solvent, the adhesive layer is formed by applying the adhesive to the surface of the liquid crystal cured layer or the primer layer, and removing the solvent. The adhesive layer formed of the pressure-sensitive adhesive can also be formed by a method of applying a pressure-sensitive adhesive to a releasing surface of a film subjected to a releasing treatment, removing a solvent to form an adhesive layer on the releasing surface of a film subjected to a releasing treatment, and boding the film with the adhesive layer to the surface of the liquid crystal cured layer or the primer layer with the adhesive layer being used as a laminating surface. A corona treatment can enhance the adhesion between the liquid crystal cured layer or the primer layer and the adhesive layer more significantly.

Examples of the method of applying an adhesive include the same methods as those listed as the method of applying an orienting polymer composition to a substrate. Examples of the method of removing the solvent from the applied adhesive include the same methods as those listed as the method of removing a solvent from an orienting polymer composition.

<Circularly Polarizing Plate>

When the receiver is a polarizer or a polarizing plate, the substrate is removed from the optically anisotropic sheet according to the present embodiment to obtain an optically anisotropic film, and the optically anisotropic film is transferred to a receiver to obtain a circularly polarizing plate as a laminate.

<Applications>

The optically anisotropic film and the circularly polarizing plate can be used in a variety of display devices. The display device is a device having a display element, and includes a light-emitting element or light-emitting device as a light emitting source. Examples of the display devices include liquid crystal displays, organic electroluminescence (EL) displays, inorganic electroluminescence (EL) displays, touch panel displays, electron emission displays (field emission displays (such as FEDs) and surface field emission displays (SEDs)), electronic paper (such as displays using an electronic ink and an electrophoretic element, plasma displays, projection displays (grating light valve (GLV) displays, and displays having a digital micromirror device (DMD)), and piezoelectric ceramic displays. The liquid crystal display devices include all of transmissive liquid crystal displays, semi-transmissive liquid crystal displays, reflective liquid crystal displays, direct viewing liquid crystal displays, and projection liquid crystal display devices. These display devices may be display devices that display two-dimensional images or may be stereoscopic displays that display three-dimensional images. In particular, the circularly polarizing plate can be effectively used in organic electroluminescence (EL) display devices and inorganic electroluminescence (EL) display devices while the optical compensation polarizing plate can be effectively used in liquid crystal display devices and touch panel display devices.

FIG. 1 is a schematic view showing a cross section of a configuration of a liquid crystal display device 10 including an optically anisotropic film. A liquid crystal layer 17 is interposed between two substrates 14a and 14b. A color filter 15 is disposed on the substrate 14a on the side of the liquid crystal layer 17. The color filter 15 is disposed facing pixel electrodes 22 with the liquid crystal layer 17 being interposed therebetween, and black matrices 20 are disposed facing boundaries between the pixel electrodes. A transparent electrode 16 is disposed on the liquid crystal layer 17 to cover the color filter 15 and the black matrices 20. An overcoat layer (not shown) may be disposed between the color filter 15 and the transparent electrode 16.

Thin film transistors 21 and the pixel electrodes 22 are regularly disposed on the substrate 14b on the side of the liquid crystal layer 17. The pixel electrodes 22 are disposed facing the color filter 15 with the liquid crystal layer 17 being interposed therebetween. An interlayer insulation film 18 having connection holes (not shown) is disposed between the thin film transistors 21 and the pixel electrodes 22.

A glass substrate or a plastic substrate is used as the substrate 14a and the substrate 14b. Examples thereof include the same substrates as those listed above. A glass substrate or a quartz substrate is preferable when the preparation of the color filter 15 and the thin film transistors 21 formed on the substrates needs a heating step to a high temperature.

An optimal material can be selected for the thin film transistor according to the material for the substrate 14b. Examples of the thin film transistor 21 include high temperature polysilicon transistors formed on quartz substrates, low temperature polysilicon transistors formed on glass substrates, and amorphous silicon transistors formed on glass substrates or plastic substrates. To reduce the size of the liquid crystal display device, a driver IC may be disposed on the substrate 14b.

The liquid crystal layer 17 is disposed between the transparent electrode 16 and the pixel electrodes 22. The liquid crystal layer 17 includes a spacer 23 to keep a predetermined distance between the substrate 14a and the substrate 14b. The shape of the spacer shown has a column shape, but should not be limited to this shape, and the spacer can have any shape such that the spacer can keep a predetermined distance between the substrate 14a and the substrate 14b.

The substrate 14a, the color filter 15, the black matrices 20, the transparent electrode 16, the liquid crystal layer 17, the pixel electrodes 22, the interlayer insulation film 18 and the thin film transistors 21, and the substrate 14b are disposed in this order.

In the substrate 14a and the substrate 14b having the liquid crystal layer 17 therebetween, polarizing films 12a and 12b are disposed on the outer surfaces of the substrate 14a and the substrate 14b, respectively. Furthermore, retardation films (such as ¼ wavelength plates and optical compensation films) 13a and 13b are disposed, and the optically anisotropic film is used as at least one of these retardation films. By these retardation films, the liquid crystal display device 10 can be given a function to convert incident light into linearly polarized light components. The retardation films 13a and 13b need not be disposed according to the structure of the liquid crystal display device and the type of the liquid crystal compound contained in the liquid crystal layer 17.

Use of the liquid crystal cured layer as the retardation film 13a and/or 13b can attain a thinner liquid crystal display device 10.

A backlight unit 19 as a light emitting source is disposed on the outer side of the polarizing film 12b. The backlight unit 19 includes a light source, a light guiding member, a reflective plate, a diffusion sheet, and a viewing angle adjusting sheet. Examples of the light source include electroluminescence, cold-cathode tubes, hot-cathode tubes, light emission diodes (LEDs), laser light sources, and mercury lamps.

When the liquid crystal display device 10 is a transmissive liquid crystal display device, the white light emitted from the light source in the backlight unit 19 enters the light guiding member, in which the traveling direction is changed by the reflective plate, and the light is diffused by the diffusion sheet. The diffused light is adjusted by the viewing angle adjusting sheet to have a desired directionality, and enters the polarizing film 12b from the backlight unit 19.

Among the incident light, which is non-polarized light, only one of linearly polarized light components transmits through the polarizer 12b of the liquid crystal panel. The linearly polarized light component sequentially transmits through the substrate 14b, the pixel electrodes 22, and the like to the liquid crystal layer 17.

The state of orientation of the liquid crystal molecules contained in the liquid crystal layer 17 changes according to the difference in potential between the pixel electrodes 22 and the transparent electrode 16 facing the pixel electrodes, thereby controlling the luminance of the light emitted from the liquid crystal display device 10. When the liquid crystal layer 17 is in the state of orientation such that the polarized light is transmitted as it is, the light transmitted through the liquid crystal layer 17, the transparent electrode 16, and the color filter 15 is absorbed by the polarizing film 12a. As a result, the pixel displays black.

Conversely, when the liquid crystal layer 17 is in the state of orientation such that the polarized light is converted and transmitted, the polarized light transmits through the liquid crystal layer 17 and the transparent electrode 16; a light component in a specific wavelength range transmits through the color filter 15 to the polarizing film 12a; and the liquid crystal display device displays the color determined by the color filter with the maximum brightness. In the intermediate state of orientation between these two states, a light component having an intermediate luminance between those described above is emitted from the liquid crystal display device 10, so that the pixel displays a corresponding intermediate color.

FIG. 2 includes (a) a schematic view showing an organic EL display device 30 and (b) a schematic view showing an organic EL display device 30. The organic EL display device 30 shown in (a) of FIG. 2 includes a circularly polarizing plate 31, a substrate 32, an interlayer insulation film 33, pixel electrodes 34, a light emission layer 35, and a cathode electrode 36. The circularly polarizing plate 31 is disposed on the substrate 32 on the side opposite to the light emission layer 35. When a positive voltage is applied to the pixel electrodes 34, a negative voltage is applied to the cathode electrode 36, and DC current is applied between the pixel electrodes 34 and the cathode electrode 36, the light emission layer 35 emits light. The light emission layer 35 includes an electron transport layer, a light emission layer, and a hole transport layer. The light emitted from the light emission layer 35 transmits through the pixel electrodes 34, the interlayer insulation film 33, the substrate 32, and the circularly polarizing plate 31.

In preparation of the organic EL display device 30, first, a thin film transistor 38 having a desired shape is formed on the substrate 32. The interlayer insulation film 33 is formed; then, the pixel electrode 34 is formed by sputtering, and is patterned. Subsequently, the light emission layer 35 is formed thereon.

Next, the circularly polarizing plate 31 is disposed on the surface opposite to the surface of the substrate 32 having the thin film transistor 38. In this case, the polarizing plate in the circularly polarizing plate 31 is disposed on the outer side (side opposite to the substrate 32).

Examples of the substrate 32 include ceramic substrates such as sapphire glass substrates, quartz glass substrates, soda-lime glass substrates, and alumina; metal substrates of copper and the like; and plastic substrates. A thermal conductive film, which is not shown, may be formed on the substrate 32. Examples of the thermal conductive film include diamond thin film (DLCs). In reflective pixel electrodes 34, light is emitted to the direction opposite to the substrate 32. Accordingly, not only transparent materials but also non-transparent materials such as stainless steel can be used. The substrate may be formed of a single substrate, or may be a laminate substrate formed of a plurality of substrates laminated to each other with an adhesive. These substrates may be plates or films.

For the thin film transistor 38, a polycrystalline silicon transistor or the like may be used. The thin film transistors 38 are disposed on ends of the pixel electrodes 34, and the dimension is 10 to 30 μm. The dimension of the pixel electrode 34 is 20 μm×20 μm to 300 μm×300 μm.

Wiring electrodes for the thin film transistors 38 are disposed on the substrate 32. The wiring electrodes have low resistance, and are electrically connected to the pixel electrodes 34 to reduce the resistance value; usually, the wiring electrode used contains one or two or more of Al, Al and transition metals (excluding Ti), Ti, and titanium nitride (TiN).

The interlayer insulation film 33 is disposed between the thin film transistor 38 and the pixel electrode 34. The interlayer insulation film 33 may be any one of insulating films such as films formed of silicon oxide such as $SiO_2$ or an inorganic material such as silicon nitride by sputtering or vacuum deposition; silicon oxide layers formed by spin on glass (SOG); and coating films formed of resin materials such as photoresists, polyimide and acrylic resins.

Ribs 39 are formed on the interlayer insulation film 33. The ribs 39 are disposed near the pixel electrodes 34 (between adjacent pixels). Examples of the material for the rib 39 include acrylic resins and polyimide resins. The thickness of the rib 39 is preferably 1.0 to 3.5 μm, more preferably 1.5 to 2.5 μm.

Next, an EL element including pixel electrodes 34, the light emission layer 35, and the cathode electrode 36 will be described. The light emission layer 35 includes at least one hole transport layer and at least one light emission layer; the light emission layer 35 includes an electron-injection transport layer, a light emission layer, a hole transport layer, and a hole-injection layer.

Examples of materials for the pixel electrode 34 include tin-doped indium oxide (ITO), zinc-doped indium oxide (IZO), IGZO, ZnO, $SnO_2$ and $In_2O_3$; particularly ITO and IZO are preferable. The pixel electrode 35 has any thickness equal to or greater than a predetermined thickness enabling sufficient hole-injection, and the thickness is preferably 10 to 500 nm.

The pixel electrode 34 can be formed by a deposition method (preferably sputtering). Examples of the sputtering gas include inert gases such as Ar, He, Ne, Kr and Xe, and mixed gases thereof.

Examples of materials for forming the cathode electrode 36 include metal elements such as K, Li, Na, Mg, La, Ce, Ca, Sr, Ba, Al, Ag, In, Sn, Zn and Zr; to enhance the operating stability of the electrode, alloy systems composed of two or three components selected from the metal elements listed above are preferable. Preferable alloy systems are Ag—Mg (Ag: 1 to 20 at %), Al—Li (Li: 0.3 to 14 at %), In—Mg (Mg: 50 to 80 at %), Al—Ca (Ca: 5 to 20 at %), and the like.

The cathode electrode 36 is formed by a deposition method, sputtering, and the like. The thickness of the cathode electrode 36 is usually 0.1 nm or more, preferably 1 to 500 nm.

The hole-injection layer facilitates injection of holes from the pixel electrode 34 and also is referred to as charge-injection layer; the hole transport layer transports holes and inhibits electrons and also is referred to as a charge transport layer.

The thickness of the light emission layer, the total thickness of the hole-injection layer and the hole transport layer, and the thickness of the electron-injection transport layer are preferably 5 to 100 nm. A variety of organic compounds can be used in the hole-injection layer and the hole transport layer. The method of forming a hole-injection transport layer, a light emission layer, and an electron-injection transport layer is preferably a vacuum deposition method because a uniform thin film can be formed.

The followings can be used as the light emission layer 35: light emission layers using the light emission from singlet excitons (fluorescence); those using the light emission from triplet excitons (phosphorescence); those including layers using the light emission from singlet excitons (fluorescence) and layers using the light emission from triplet excitons (phosphorescence); those formed of organic substances; those including layers formed of organic substance and layers formed of inorganic substances; those comprising materials for polymers; those comprising low molecule materials; and those including layers comprising materials for polymers and layers comprising low molecule materials; and known various light emission layers 35 for EL elements can be used in the organic EL display device 30.

A desiccant (not shown) is disposed between the cathode electrode 36 and a sealing layer 37. The desiccant absorbs the moisture content to prevent deterioration of the light emission layer 35.

The organic EL display device 30 according to the present embodiment shown in (b) of FIG. 2 includes the circularly polarizing plate 31, the substrate 32, the interlayer insulation film 33, the pixel electrodes 34, the light emission layer 35, and the cathode electrode 36. The sealing layer 37 is formed on the cathode electrode, and the circularly polarizing plate 31 is disposed on the side opposite to the substrate 32. The light emitted from the light emission layer 35 transmits through the cathode electrode 36, the sealing layer 37, and the circularly polarizing plate 31.

EXAMPLES

The present invention will now be described in more detail by way of Examples. In the Examples, "%" and "parts" indicates % by mass and parts by mass, respectively, unless otherwise specified.

In the Examples, a corona treatment was performed on the following conditions (apparatus: AGF-B10 manufactured by KASUGA Denki, Inc., output: 0.3 kW, treating rate: 3 m/min, the number of treatments: once).

[Preparation of Composition for Forming a Photo-Orientation Layer]

The following components were mixed, and the resulting mixture was stirred at 80° C. for 1 hour to prepare a composition for forming a photo-orientation layer (1). The following polymer having a photoreactive group was synthesized by the method described in JP 2013-33248 A.

Polymer Having a Photoreactive Group: 1 Part

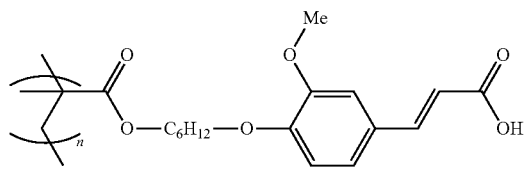

solvent: propylene glycol monomethyl ether, 99 parts

[Preparation of Composition for Forming a Liquid Crystal Cured Layer (1)]

The following components were mixed, and the resulting mixture was stirred at 80° C. for 1 hour to prepare a composition for forming a liquid crystal cured layer (1). Polymerizable liquid crystal compound A1 was synthesized by the method described in JP 2010-31223 A. Polymerizable liquid crystal compound A2 was synthesized by the method described in JP 2010-24438 A.

Polymerizable Liquid Crystal Compound A1: 86 Parts

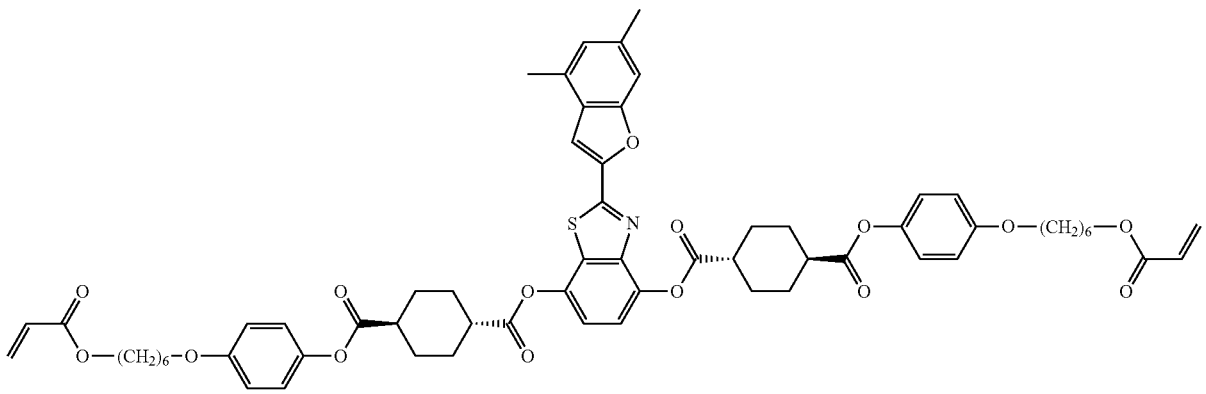

Polymerizable Liquid Crystal Compound A2: 14 Parts

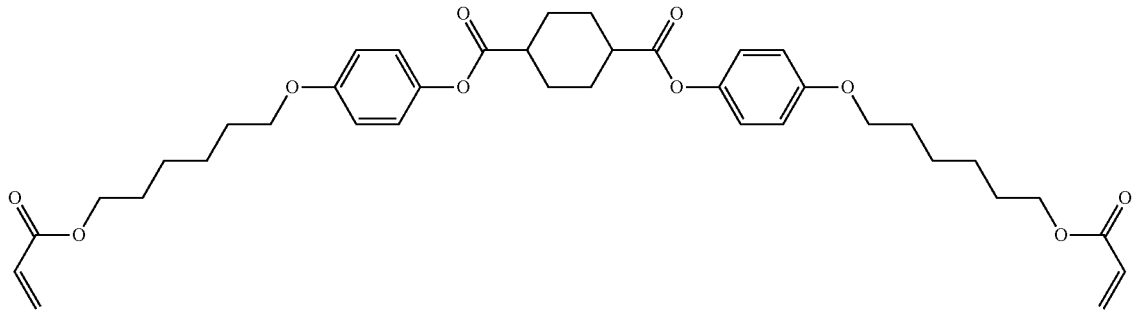 [SMILES: C=CC(=O)OCCCCCCOc1ccc(OC(=O)C2CCC(C(=O)Oc3ccc(OCCCCCCOC(=O)C=C)cc3)CC2)cc1]

polymerization initiator: 2-dimethylamino-2-benzyl-1-(4-morpholinophenyl)butane-1-one (Irgacure (registered trademark) 369, manufactured by BASF Japan Ltd.), 6 parts
leveling agent: polyacrylate compound (BYK-361 N, manufactured by BYK-Chemie GmbH), 0.1 parts
polymerization inhibitor: dibutylhydroxytoluene (manufactured by Wako Pure Chemical Industries, Ltd.), 1 part
solvents: N-methyl-2-pyrrolidinone, 160 parts, and cyclopentanone, 240 parts

[Preparation of Active Energy Ray-Curable Adhesive]

The following components were mixed to prepare an active energy ray-curable adhesive (1).
3,4-epoxycyclohexylmethyl-3,4-epoxycyclohexane carboxylate, 40 parts
diglycidyl ether of bisphenol A, 60 parts
diphenyl(4-phenylthiophenyl)sulfonium hexafluoroantimonate (photocationic polymerization initiator), 4 parts

[Polyethylene Terephthalate Film]

A polyethylene terephthalate film (1) (hereinafter referred to as a PET film (1)) used was "DIAFOIL (registered trademark) T140 E25" manufactured by Mitsubishi Plastics, Inc.

A polyethylene terephthalate film (2) (hereinafter referred to as a PET film (2)) used was "E5000" manufactured by Toyobo Co., Ltd.

[Measurement of Water Contact Angle]

The water contact angles on the outer surfaces of the rolls of PET films (1) and (2) were measured with DropMaster 700 manufactured by Kyowa Interface Science Co., Ltd. by a drop method (amount of a solution to be dropped: 1.2 μL). The results are shown in Table 1.

[Measurement of Surface Roughness]

The surface roughnesses on the outer surfaces of the rolls of the PET films (1) and (2) were measured with an SPM (manufactured by Hitachi High-Tech Science Corporation, SPA-300HV and SPI4000). In the PET films, the surface roughness was measured at 3 points in a field of view of 1 μm² with Cantilever SI-DF20 (with an Al coat on the rear surface) to determine the average. The results are shown in Table 1.

TABLE 1

| | Water contact angle (°) | Surface roughness Ra (nm) |
|---|---|---|
| PET film (1) | 76.9 | 0.7 |
| PET film (2) | 65.3 | 14 |

Example 1

[Preparation of Optical Anisotropic Film]

1. Formation of Photo-Orientation Layer

The composition for forming a photo-orientation layer (1) was applied onto the outer surface of a roll of the PET film (1) by bar coating, and the coating was dried by heating in an oven at 60° C. for 1 minute. The dry coating film obtained was irradiated with polarized light UV to form a photo-orientation layer (1) on the surface of the PET film (1). In the treatment with polarized UV light, exposure with polarized UV light was performed with a UV irradiation apparatus (SPOT CURE SP-7; manufactured by Ushio Inc.) at an amount of accumulated light of 100 mJ/cm². The film thickness of the photo-orientation layer (1) obtained was 160 nm.

2. Formation of Liquid Crystal Cured Layer

The Composition for Forming a Liquid Crystal Cured Layer (1) was applied to the surface of the photo-orientation layer (1) by bar coating, and the coating was dried by heating in an oven at 120° C. for 1 minute, followed by cooling to room temperature to prepare a dry coating film. The dry coating film obtained was irradiated with ultraviolet light at an amount of exposure of 1000 mJ/cm² (in terms of 365 nm) from a UV irradiation apparatus (SPOT CURE SP-7; manufactured by Ushio Inc.) to prepare a liquid crystal cured layer (1) cured in the state where the polymerizable liquid crystal compound was oriented horizontally to the in-plane of the substrate, and an optically anisotropic sheet (1) was obtained. The thickness of the liquid crystal cured layer prepared was measured with a laser microscope (manufactured by Olympus Corporation, OLS3000), and it was 2.3 μm.

3. Transfer of Liquid Crystal Cured Layer

After the surface of the liquid crystal cured layer (1) obtained was subjected to a corona treatment, the active energy ray-curable adhesive (1) was applied to the treated surface by bar coating, a Zeonor film having a corona-treated surface was press laminated thereon, and the Zeonor film was irradiated with ultraviolet light having an amount of exposure of 1000 mJ/cm² (in terms of 365 nm) from a UV irradiation apparatus (SPOT CURE SP-7; manufactured by Ushio Inc.). The PET film (1) and the photo-orientation layer (1) were removed at the same time to transfer the liquid crystal cured layer onto the Zeonor film; thereby, a laminate (1) comprising the liquid crystal cured layer (1), the adhesive layer, and the Zeonor film was obtained. At this time, the total thickness of the adhesive layer and the liquid crystal cured layer (1) was 4.8 μm.

4. Measurement of Retardation

The retardation value of the laminate (1) was measured with a measuring apparatus (KOBRA-WR, manufactured by Oji Scientific Instruments Ltd.) in the wavelength range of 450 nm to 700 nm, and the retardation value Re(450) at a wavelength of 450 nm, the retardation value Re(550) at a wavelength of 550 nm, and the retardation value Re(650) at a wavelength of 650 nm were calculated with a program attached to the apparatus; the obtained values were:

$Re(450)=126$ nm $Re(550)=145$ nm $Re(650)=149$ nm $Re(450)/Re(550)=0.87$ $Re(650)/Re(550)=1.03$

Namely, the liquid crystal cured layer (1) had the optical properties expressed by formulas (1) and (2). Because the retardation value at a wavelength of 550 nm of the Zeonor film is substantially 0, the relation of the front retardation value is not affected.

$Re(450)/Re(550) \leq 1.00$ (1)

$1.00 \leq Re(650)/Re(550)$ (2)

Reference Example 1

1. Formation of Liquid Crystal Cured Layer

A liquid crystal cured layer (1) was formed in the same manner as in Example 1 except that the PET film (1) was replaced by the PET film (2), and an optically anisotropic sheet (2) was obtained. The thickness of the liquid crystal cured layer prepared was measured with a laser microscope (manufactured by Olympus Corporation, OLS3000), and it was 2.2 μm.

2. Transfer of Liquid Crystal Cured Layer

After the surface of the liquid crystal cured layer (2) obtained was subjected to a corona treatment, the active energy ray-curable adhesive (1) was applied to the treated surface by bar coating, a Zeonor film having a corona-treated was press laminated thereon and the Zeonor film was irradiated with ultraviolet light having an amount of exposure of 1000 mJ/cm² (in terms of 365 nm) from a UV irradiation apparatus (SPOT CURE SP-7; manufactured by Ushio Inc.). The PET film (2) and the photo-orientation layer were removed at the same time to transfer the liquid crystal cured layer onto the Zeonor film; thereby, a laminate (2) comprising the liquid crystal cured layer (1), the adhesive layer, and the Zeonor film was obtained. During the removal of the PET film (2) and the photo-orientation layer, defects such as striped traces and projections were generated on the surface of the liquid crystal cured layer. The total thickness of the adhesive layer and the liquid crystal cured layer (1) was 4.8 μm.

3. Measurement of Retardation

The retardation value of the laminate (2) was measured with the same manner as Example 1, the obtained values were:

$Re(450)=118$ nm $Re(550)=136$ nm $Re(650)=140$ nm $Re(450)/Re(550)=0.87$ $Re(650)/Re(550)=1.03$

Namely, the liquid crystal cured layer (1) had the optical properties expressed by formulas (1) and (2). Because the retardation value at a wavelength of 550 nm of the Zeonor film is substantially 0, the relation of the front retardation value is not affected.

$Re(450)/Re(550) \leq 1.00$ (1)

$1.00 \leq Re(650)/Re(550)$ (2)

[Evaluation]

The haze values of the PET film (1), the PET film (2), the optically anisotropic sheet (1), the optically anisotropic sheet (2), a laminate (1) and a laminate (2) were measured with a haze meter (type HZ-2) manufactured by Suga Test Instruments Co., Ltd. by a double beam method. A smaller haze value indicates higher transparency. The results are shown in Table 2. It was visually checked whether defects were generated.

TABLE 2

|  | Haze value (%) | Defects |
| --- | --- | --- |
| PET film (1) | 1.85 | None |
| PET film (2) | 5.70 | None |
| Optical anisotropic sheet (1) | 1.05 | None |
| Optical anisotropic sheet (2) | 1.09 | None |
| Laminate (1) | 0.49 | None |
| Laminate (2) | 3.2 | Found |

It was found that the laminate obtained from the optically anisotropic sheet according to the present invention has high transparency and reduces defects. The optically anisotropic sheet (1) and the optically anisotropic sheet (2) showed no big difference in the transparency and defects before transfer. Namely, it was found that the optically anisotropic sheet according to the present invention has high properties in applications of transfer.

The optically anisotropy sheet according to the present invention is useful enough to be able to transfer an optically anisotropic film which is barely generates defects.

What is claimed is:

1. An optically anisotropic sheet comprising a substrate, an orientation layer, and a liquid crystal cured layer laminated in this order,
   wherein the substrate has a surface roughness of 1.0 nm or less in a field of view of 1 μm² and a water contact angle of 70° to 90° and the orientation layer is a photo-orientation layer.

2. The optically anisotropic sheet according to claim 1, wherein the substrate comprises polyethylene terephthalate.

3. The optically anisotropic sheet according to claim 1, wherein the liquid crystal cured layer satisfies formulas (1) and (2):

$Re(450)/Re(550) \leq 1.00$ (1)

$1.00 \leq Re(650)/Re(550)$ (2)

where Re(450), Re(550), and Re(650) represent front retardation values at wavelengths of 450 nm, 550 nm and 650 nm, respectively.

4. The optically anisotropic sheet according to claim 1, wherein the thickness of the liquid crystal cured layer is from 0.5 to 5 μm.

5. A laminate that is obtained by forming an adhesive layer on a surface of the liquid crystal cured layer of the optically anisotropic sheet according to claim 1, then laminating a receiver on the adhesive layer, and then removing the substrate of the optically anisotropic sheet.

6. A display device including the laminate according to claim 5.

7. The optically anisotropic sheet according to claim 1, wherein the photo-orientation layer is formed from a composition for forming a photo-orientation layer which comprises a compound having at least a group selected from a cinnamoyl group and a chalcone group.

8. The optically anisotropic sheet according to claim 1, wherein the liquid crystal cured layer is formed from a composition for forming a liquid crystal cured layer comprising a compound represented by formula (A):

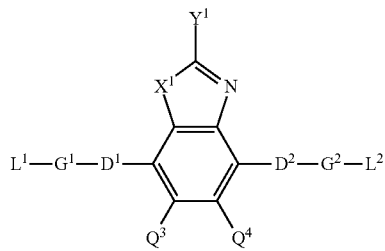

(A)

where $X^1$ represents an oxygen atom, a sulfur atom, or —$NR^1$—; $R^1$ represents a hydrogen atom or an alkyl group having 1 to 4 carbon atoms;

$Y^1$ represents an optionally substituted monovalent aromatic hydrocarbon group having 6 to 12 carbon atoms or an optionally substituted monovalent aromatic heterocyclic group having 3 to 12 carbon atoms;

$Q^3$ and $Q^4$ each independently represent a hydrogen atom, an optionally substituted monovalent aliphatic hydrocarbon group having 1 to 20 carbon atoms, a monovalent alicyclic hydrocarbon group having 3 to 20 carbon atoms, an optionally substituted monovalent aromatic hydrocarbon group having 6 to 20 carbon atoms, a halogen atom, a cyano group, a nitro group, —$NR^2R^3$ or —$SR^2$, or $Q^3$ bonds to $Q^4$ to form an aromatic ring or an aromatic heterocycle through carbon atoms bonded to $Q^3$ and $Q^4$; $R^2$ and $R^3$ each independently represent a hydrogen atom or an alkyl group having 1 to 6 carbon atoms;

$D^1$ and $D^2$ each independently represent a single bond, —C(=O)—O—, —C(=S)—O—, —$CR^4R^5$—, —$CR^4R^5$—$CR^6R^7$—, —O—$CR^4R^5$—, —$CR^4R^5$—O—$CR^6R^7$—, —CO—O—$CR^4R^5$—, —O—CO—$CR^4R^5$—, —$CR^4R^5$—O—CO—$CR^6R^7$—, —$CR^4R^5$—CO—O—$CR^6R^7$—, —$NR^4$—$CR^5R^6$— or —CO—$NR^4$—;

$R^4$, $R^5$, $R^6$ and $R^7$ each independently represent a hydrogen atom, fluorine atom, or an alkyl group having 1 to 4 carbon atoms;

$G^1$ and $G^2$ each independently represent a divalent alicyclic hydrocarbon group having 5 to 8 carbon atoms, where the methylene group forming the alicyclic hydrocarbon group may be substituted by an oxygen atom, a sulfur atom or —NH—, and the methine group forming the alicyclic hydrocarbon group may be substituted by a tertiary nitrogen atom; and $L^1$ and $L^2$ each independently represent a monovalent organic group, and at least one of $L^1$ and $L^2$ has a polymerizable group.

9. A laminate that is obtained by forming an adhesive layer on a surface of the liquid crystal cured layer of the optically anisotropic sheet according to claim 1, then laminating a receiver on the adhesive layer.

* * * * *